(12) United States Patent
Zhang et al.

(10) Patent No.: US 12,118,324 B1
(45) Date of Patent: Oct. 15, 2024

(54) DOMAIN-SPECIFIC LANGUAGE MODELS

(71) Applicant: Amazon Technologies, Inc., Seattle, WA (US)

(72) Inventors: Li Zhang, Yorktown Heights, NY (US); Sanjiv Ranjan Das, San Jose, CA (US); Yue Zhao, Redmond, WA (US); Zhijiang He, Sunnyvale, CA (US); Shenghua Yue, Redwood City, CA (US); Zheng Zhang, Jersey City, NJ (US); Xin Huang, Long Island, NY (US); Sheng Zha, New York, NY (US); Shuai Zheng, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/710,727

(22) Filed: Mar. 31, 2022

(51) Int. Cl.
*G06F 16/35* (2019.01)
*G06F 16/34* (2019.01)
*G06F 40/284* (2020.01)
*G06F 40/40* (2020.01)

(52) U.S. Cl.
CPC ............ *G06F 40/40* (2020.01); *G06F 16/345* (2019.01); *G06F 16/355* (2019.01); *G06F 40/284* (2020.01)

(58) Field of Classification Search
CPC ...... G06F 40/40; G06F 16/345; G06F 16/355; G06F 40/284; G06F 40/10; G06N 3/082
See application file for complete search history.

(56) References Cited

U.S. PATENT DOCUMENTS

| | | | |
|---|---|---|---|
| 10,102,480 B2 | 10/2018 | Dirac et al. | |
| 10,503,827 B2 * | 12/2019 | Kurata | G06F 40/20 |
| 2015/0046371 A1 | 2/2015 | Leary | |
| 2021/0193130 A1 * | 6/2021 | Mehta | G10L 15/10 |
| 2022/0108081 A1 * | 4/2022 | Dymetman | G06F 40/10 |
| 2023/0153641 A1 | 5/2023 | Manda et al. | |

FOREIGN PATENT DOCUMENTS

| | | | | |
|---|---|---|---|---|
| CN | 111581395 B | * | 9/2023 | G06F 16/355 |
| WO | 2015/033341 A1 | | 3/2015 | |

OTHER PUBLICATIONS

Burke et al.; NukeLM: Pre-Trained and Fine-Tuned Language Models for the Nuclear and Energy Domains; Computation and Language (cs.CL), ;arXiv:2105.12192 [cs.CL]; May 25, 2021 (Year: 2021).*

(Continued)

*Primary Examiner* — Abul K Azad
(74) *Attorney, Agent, or Firm* — Nicholson De Vos Webster & Elliott LLP

(57) ABSTRACT

Techniques for machine learning (ML) and natural language processing (NLP) are described. One technique enables the creation of a clean training dataset through just a few API calls. Another technique provides an automated process for generating a domain-specific lexicon, which is then used to generate ML training datasets, in a manner that requires little to no human labor. Another technique gathers ML training data from domain-specific public sources, which are more likely than typical public sources to contain focused terminology and to be free from errors, thus resulting in trained ML models that provide more accurate inferences.

20 Claims, 10 Drawing Sheets

(56) References Cited

OTHER PUBLICATIONS

Hasan, Mohammad; How to Churn Deep Contextual Models ?; WI-IAT '21: IEEE/WIC/ACM International Conference on Web Intelligence and Intelligent Agent Technology; Dec. 2021pp. 226-233https://doi.org/10.1145/3486622.3493962. (Year: 2021).*

Sanjiv Das et al., Context, Language Modeling, and Multimodal Data in Finance, Jan. 2021, 1-15.

Sanjiv Das et al., Use pre-trained financial language models for transfer learning in Amazon SageMaker Jumpstart, Sep. 30, 2021, 1-12.

Sanjiv Das et al., Use SEC Text for Ratings Classification Using Multimodal ML in Amazon SageMaker JumpStart, Sep. 30, 2021, 1-20.

Non-Final Office Action, U.S. Appl. No. 17/710,705, May 2, 2024, 21 pages.

\* cited by examiner

*FIG. 2*

DOMAIN-SPECIFIC LANGUAGE MODELS

BACKGROUND

Machine learning (ML) is the study of computer algorithms that can improve automatically through experience and by the use of data. ML algorithms build a model based on sample data, known as training data, in order to make predictions or decisions without being explicitly programmed to do so. ML algorithms are used in a wide variety of applications, such as in medicine, email filtering, speech recognition, and computer vision, where it is difficult or unfeasible to develop conventional algorithms to perform the needed tasks.

Natural language processing (NLP) is an application for ML (and a subfield of artificial intelligence) concerned with the interactions between computers and human language, in particular how to program computers to process and analyze large amounts of natural language data. The goal is a computer capable of understanding the contents of documents, including the contextual nuances of the language within them. The technology can then accurately extract information and insights contained in the documents as well as categorize and organize the documents themselves.

BRIEF DESCRIPTION OF DRAWINGS

Various embodiments in accordance with the present disclosure will be described with reference to the drawings, in which:

FIG. 2 is a diagram illustrating an interactive data table according to some embodiments.

DETAILED DESCRIPTION

The present disclosure relates to methods, apparatus, systems, and non-transitory computer-readable storage media for building, training, and deploying machine learning (ML) models. In particular, embodiments described in the present disclosure solve several technical problems in ML and natural language processing (NLP). For example, training data for ML models is sometimes gathered (e.g., downloaded) from public sources (e.g., Wikipedia). Data gathered in this way must be parsed, formatted, and edited before it can be used for training an ML model. Constructing a clean dataset with added features is a time-consuming exercise, even for good technologists. Embodiments described in the present disclosure solve this technical problem by enabling the creation of a clean dataset through just a few API calls.

In another example, ML training datasets are typically created manually. These processes are not only laborious and error-prone, but they also require specialized knowledge and skills, such that they are also expensive. Embodiments described in the present disclosure solve this technical problem by providing an automated process for generating a domain-specific lexicon, which is then used to generate ML training datasets, in a manner that requires little to no human labor.

In another example, ML training data gathered from public sources (e.g., Wikipedia) typically contains errors (e.g., misspellings, grammar mistakes, misstatements of fact, improper word usage, etc.). Language models trained on such data are less likely to provide accurate inferences. Embodiments described in the present disclosure solve this technical problem by gathering ML training data from domain-specific public sources, which are more likely than typical public sources to contain focused terminology and to be free from the types of errors described above. The domain-specific training data is then used to retrain pre-trained language models, resulting in more accurate inferences.

Figure 1:
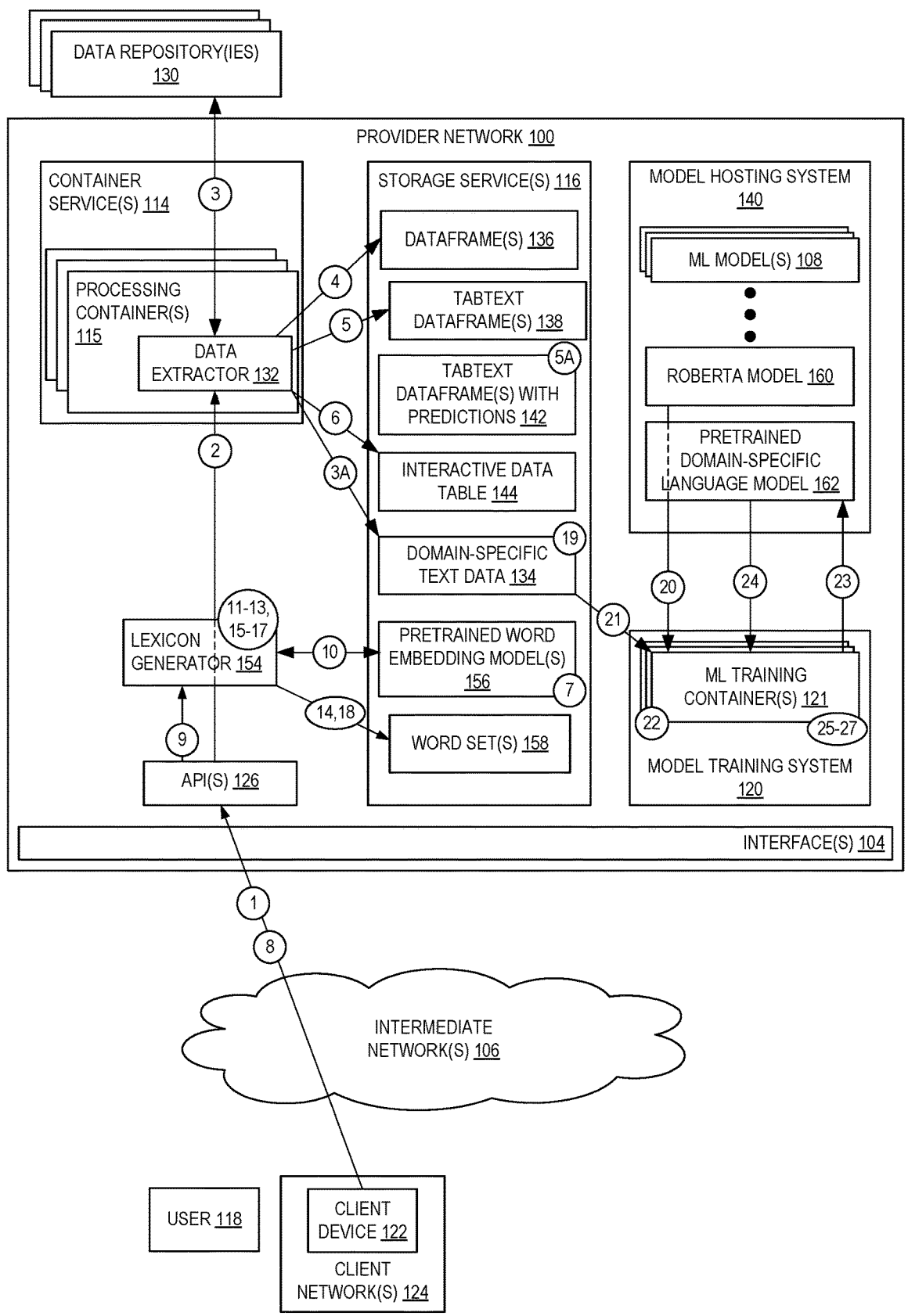
FIG. 1 is a functional block diagram illustrating an environment for building, training, and deploying machine learning (ML) models according to some embodiments.

FIG. 1 illustrates an environment for building, training, and deploying ML models according to some embodiments. The illustrated environment includes a provider network 100 hosting a set of services (e.g., Amazon SageMaker) that enable developers and data scientists to build, train, and deploy ML models quickly. The services of the provider network 100 reduce the heavy lifting from each step of the ML process to make it easier to develop, train, and deploy high-quality models with different ML frameworks, such as PyTorch and TensorFlow. As further described below, a developer may use the services of the provider network 100 to deploy a simple solution to retrieve domain-specific ML training data and construct a dataframe of mixed tabular and text data, which may be referred to herein as "TabText." This process may be one step in a machine learning workflow according to some of the present embodiments. For example, in FIG. 1, the circles labeled "1"-"6" illustrate an example process in which domain-specific text data is combined with tabular data to generate TabText dataframes as input to an interactive data table. This process is described in detail below.

A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s) 104, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 104 can be part of, or serve as a front-end to, a control plane (not shown) of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

For example, in various embodiments, a "serverless" function can include code provided by a user or other entity—such as the provider network itself—that can be executed on demand. Serverless functions can be maintained within a provider network by an on-demand code execution service, and can be associated with a particular user or account, or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

A container service 114 can be a container orchestration and management service (referred to in various implementations as a container service, cloud container service, container engine, or container cloud service) that allows users of the cloud provider network to instantiate and manage containers. In some embodiments the container service 114 can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

The provider network 100 includes several services and systems that are used to build, train, and deploy machine learning (ML) models. For example, the container service(s) 114 orchestrates and manages one or more processing container(s) 115 used for generating ML training data, as further described below. Storage services 116 store various types of data used in ML development and training processes, also as further described below. A model training system 120 orchestrates and manages one or more ML training containers 121 used for training ML models, also as further described below. A model hosting system 140 hosts and manages one or more ML models 108, also as further described below.

The provider network 100 communicates with one or more data repositories 130 via one or more intermediate networks 106 (e.g., the internet, not shown). In some embodiments, the data repositories 130 may be databases or websites that store or host domain-specific data, such as data associated with a specific technology or field of study (e.g., engineering, medicine, etc.), including data repositories 130 that contain academic and practitioner research. Non-limiting example data repositories 130 include databases or websites administered by The Institute of Electrical and Electronics Engineers (IEEE), databases or websites administered by the National Institutes of Health (NIH), or any other databases, websites, or sources of information that are associated with a specific technology or field of study. Data gathered from domain-specific sources tends to be of high quality, because it is curated and/or closely reviewed by experts in the pertinent technology or field of study. For example, academic papers are carefully edited and peer-reviewed prior to publication, and therefore provide a source of high quality data that is free from typographical errors and grammar errors, and contains proper usage of specialized and technical language.

In the illustrated embodiment, the provider network 100 includes a data extractor 132 within a processing container 115 of the container service 114. The data extractor 132 collects or receives (e.g., downloads) domain-specific data from the data repositories 130. For example, as shown at circle "1" in FIG. 1, a client device 122, operated by a user 118, may send a request to an application programming interface (API) 126 in the provider network 100. The request may specify one or more parameters for data to be extracted from the data repositories 130. For example, the request may specify one or more of a data domain (e.g., engineering, medicine), a source from which the data is to be extracted (e.g., a web endpoint such as a URL), a date range for the data, a minimum and/or maximum size for the data, a location in the storage service(s) 116 where the extracted data is to be stored, etc. The request may be received as input by the data extractor 132 as shown at circle "2," and the data extractor 132 may, in response to the request, download a domain-specific dataset from one or more of the data repositories 130 as shown at circle "3." The domain-specific dataset may include metadata, such as dates and parsed plain text that can then be used for machine learning. The domain-specific dataset may be stored as domain-specific text data 134 at the storage service(s) 116 in some embodiments, as shown at circle "3A."

The data extractor 132 may download data items (e.g., documents) as full text data and convert the downloaded data into a dataframe format, where a dataframe may comprise a data structure that organizes data into a two-dimensional table of rows and columns. In some embodiments, downloaded documents may contain non-textual components, such as images, and/or formatted text, such as tables. In such embodiments, the data extractor 132 may parse the downloaded documents into plain text. In some embodiments, the data extractor 132 may also extract one or more sections from documents, and automatically add the extracted section(s) in one or more separate columns of a dataframe alongside the full text of the document (or other type of data item). The extracted dataframe(s) 136 may be output by the data extractor 132 and stored at the storage service(s) 116 (e.g., at a location specified in the request from the client device) as shown at circle "4" in FIG. 1, and/or to a local notebook instance (not shown) in the provider network 100.

In some embodiments, the provider network 100 may provide a client library, such as a software development kit (SDK) that interacts with a processing container 115 in the provider network 100. Advantageously, while the retrieval, parsing, transforming, and scoring of text is a complex process that uses many different algorithms and packages, some of the present embodiments make this process seamless and stable for the user by packaging this functionality into a bucket in the storage service(s) 116. For installation and maintenance of the workflow, this approach reduces user effort to a pip (Python) install followed by a single API call. The library may provide the capability of running processing containers 115 in a customers' virtual private cloud (VPC). More specifically, when calling API operations of the client library, customers can specify their VPC configurations, such as a subnet-ID and/or a security-group-ID. The provider network 100 may then launch processing containers 115 in the VPC implied by the subnet(s), and inter-container traffic may be specified by the security group(s).

In some embodiments, the data extractor 132 may create separate dataframes 136 for different types of documents of domain-specific data. Also in some embodiments, dataframes 136 output by the data extractor 132 may include separate columns for each section extracted from documents.

In some embodiments, the data extractor 132 may combine text from two or more sections of a document in the domain-specific text data 134. For example, if a dataframe 136 output by the data extractor 132 includes separate columns for each section extracted from a document, then the data extractor 132 may combine text from two or more columns of the dataframe 136. The text of the combined sections/columns may be saved in first new column of the dataframe 136.

In some embodiments, the data extractor 132 may summarize the text in the first new column, and save the summary in a second new column of the dataframe 136. For example, the client library may provide one or more text summarizers that extract concise summaries while preserving key information and overall meaning. Non-limiting examples of text summarizers include a Jaccard summarizer and a k-medoids summarizer.

The Jaccard summarizer uses the Jaccard index (also known as the Jaccard similarity index or the Jaccard similarity coefficient). The Jaccard index compares members for two sets to see which members are shared and which are distinct. It's a measure of similarity for the two sets of data, with a range from 0% to 100%. The higher the percentage, the more similar the two populations. In some embodiments, the Jaccard summarizer provides the main theme of a document by extracting the sentences with the greatest similarity among all sentences. The metric calculates the number of common words between two sentences normalized by the size of the superset of the words in the two sentences. In some embodiments, the user (through the client device) may provide one or more parameters (e.g., summary size, summary percentage, maximum tokens, cutoff) to limit the size of the documents to be summarized. Also in some embodiments, the user (through the client device) may provide one or more vocabulary words, which the Jaccard summarizer may use to calculate Jaccard similarities between sentences. In some embodiments, the Jaccard summarizer is an extractive (not abstractive) summarizer. An extractive summarizer retains the original sentences, and thus advantageously preserves the meaning of the sentences, and also advantageously works fast on very long text. Long text is not easily handled by abstractive summarizers that are based on embeddings from transformers that can ingest a limited number of words.

k-medoids is a partitioning technique of clustering that splits the data set of n objects into k clusters, where the number k of clusters is assumed to be known a priori (which implies that the programmer must specify k before the execution of a k-medoids algorithm). The medoid of a cluster is defined as the object in the cluster whose average dissimilarity to all the objects in the cluster is minimal, that is, it is a most-centrally located point in the cluster. In some embodiments, the k-medoids summarizer clusters sentences and produces the medoid of each cluster as a summary. In some embodiments, the user (through the client device) may provide one or more parameters used to calculate the distance for clustering, such as one or more of the following distance metrics: Euclidean, cosine, or dot-product, and/or one or more of the following medoid initialization methods: random, heuristic, k-medoids++, or build. For the same reasons discussed above for the Jaccard summarizer, the k-medoids summarizer is also an extractive one.

In some embodiments, the data extractor 132 may score the combined text in the first new column using natural language processing (NLP) algorithm, and save the score in a third new column of the dataframe 136. In some embodiments, the client library may provide one or more NLP score types. Non-limiting examples of score types include positive, negative, certainty, uncertainty, sentiment, polarity, and readability. One or more of the score types may have its own word list, which is used for scanning and matching with an input text dataset. Described below are embodiments for generating one or more word lists, and these embodiments may be used to generate the word list(s) used by the data extractor 132 to score the combined text in the first new column.

In some embodiments, the readability score type may be calculated using the Gunning fog index. The Gunning fog index is a readability test for English writing. The index estimates the years of formal education a person needs to understand the text on the first reading. For instance, a fog index of 12 requires the reading level of a United States high school senior (around 18 years old). The fog index is commonly used to confirm that text can be read easily by the intended audience.

In some embodiments, the sentiment score type uses a VADER sentiment analysis method. VADER (Valence Aware Dictionary for Sentiment Reasoning) is a model used for text sentiment analysis that is sensitive to both polarity (positive/negative) and intensity (strength) of emotion. VADER sentiment analysis, which can be applied directly to unlabeled text data, relies on a dictionary that maps lexical features to emotion intensities known as sentiment scores. The sentiment score of a text can be obtained by summing up the intensity of each word in the text. For example, words like love, enjoy, happy, and like all convey a positive sentiment, but VADER is intelligent enough to understand the basic context of these words, such as did not love as a negative statement. It also understands the emphasis of capitalization and punctuation, such as ENJOY.

In some embodiments, the remaining NLP score types (e.g., positive, negative, certainty, uncertainty) may evaluate the similarity (e.g., word frequency) with their corresponding word lists. For example, the positive NLP score may have its own word list that contains positive meanings. To measure the positive score, the NLP scorer may calculate the proportion of words out of the entire text by counting every reading of the words that are in the word list of the positive score. Before matching, the words may be stemmed to match different tenses of the same word. In some embodiments, the user (through the client device) may provide a word list to calculate the predefined NLP scores, or create a custom score with a new word list.

In some embodiments, the NLP score types do not use human-curated word lists such as the dictionary from Loughran and McDonald, which is widely used in academia. Instead, the word lists are generated from word embeddings trained on standard large text corpora, and each word list comprises words that are close to the concept word (such as positive, or negative) in an embedding space. These word lists may contain words that a human might disregard, but that might still occur in the context of the concept word.

As described above, these NLP scores are added as new numerical columns to the text dataframe 136. The resulting dataframe is a mixture of tabular data and longform text, which in some embodiments may be referred to as TabText. The TabText dataframe(s) 138 may be output by the data extractor 132 and stored at the storage service(s) 116 as shown at circle "5" in FIG. 1, and/or to a local notebook instance (not shown) in the provider network 100. In some embodiments, the column(s) of the TabText dataframe(s) 138 including NLP scores may be normalized (e.g., with standard normalization or min-max scaling) prior to submitting the TabText dataframe(s) 138 for ML.

In some embodiments, the TabText dataframes 138 may be used to train a ML model for classification. For example, an AutoGluon model may be used to analyze how numerical data and text data are related to an event of interest. AutoGluon is one of the open source AWS (Amazon Web Services) libraries, and is a part of the Gluon NLP family of tools. Some embodiments may use the AutoGluon-Tabular model, which is designed for TabText. The AutoGluon-Tabular model processes the data and trains a diverse ensemble of ML models to create a predictor that is able to predict a returned label in the data. A process for training a ML model on the TabText dataframes 138 is described below. An output of the trained model may be, in some embodiments, TabText dataframes 138 with an additional column that contains the predicted labels (TabText dataframe(s) with predictions 142). The TabText dataframe(s) with predictions 142 may be stored at the storage service(s) 116 as shown at circle "5A" in FIG. 1.

Figure 2:
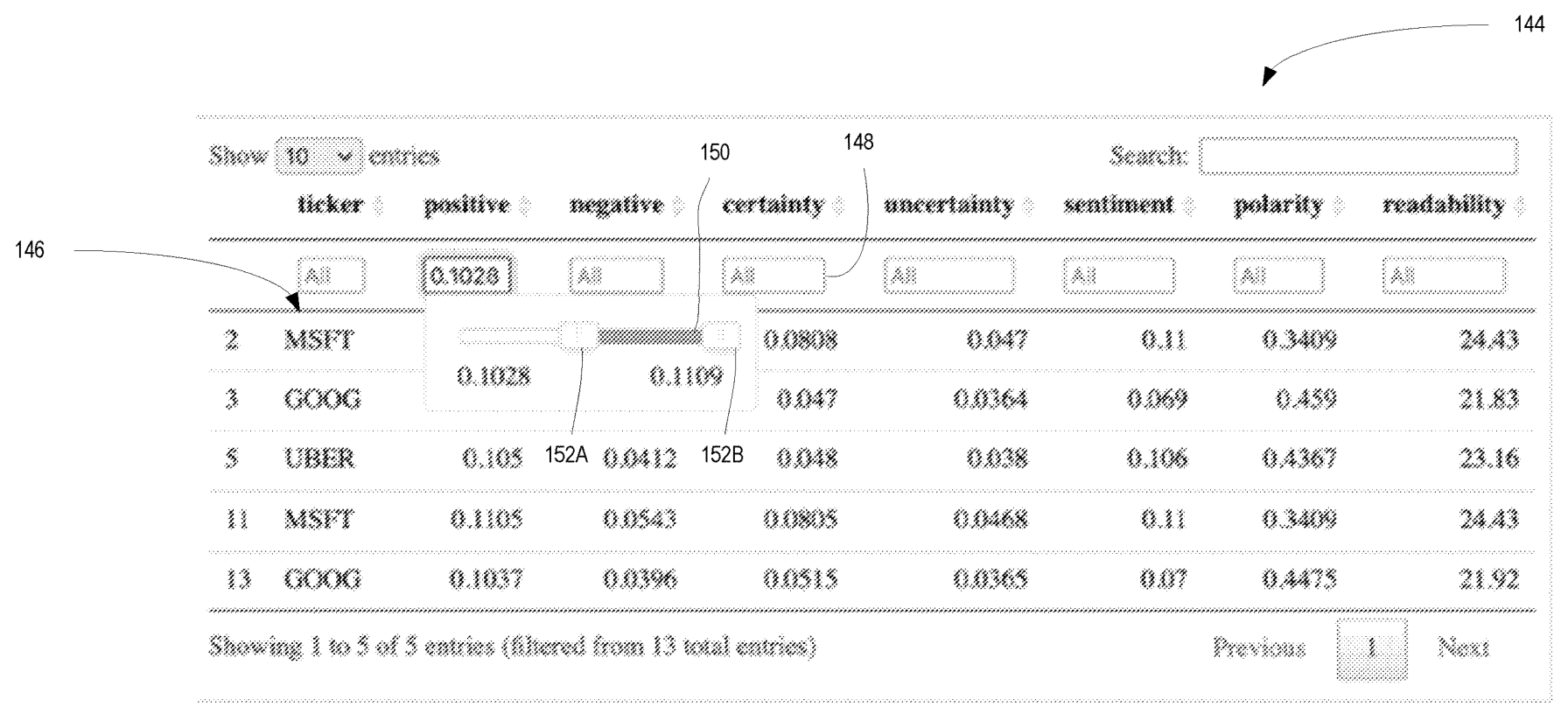

In some embodiments, the data extractor 132 may generate an interactive data table 144 using the dataframes 136, 138, 142 generated according to the processes described above. The interactive data table 144 may be output by the data extractor 132 and stored at the storage service(s) 116 as shown at circle "6" in FIG. 1, and/or to a local notebook instance (not shown) in the provider network 100. FIG. 2 illustrates an example of an interactive data table 144 according to some embodiments. The data table includes a first column 146 whose entries identify the source of the data for each row. For example, the data for rows 2 and 11 was extracted from data repositories 130 associated with Microsoft, the data for rows 3 and 13 was extracted from data repositories 130 associated with Google, and the data for row 5 was extracted from data repositories 130 associated with Uber.

The interactive data table 144 further includes separate columns for each of the score types discussed above (positive, negative, certainty, uncertainty, sentiment, polarity, readability), and the rows in each column indicate the scores of each type corresponding to each data source. Each column further includes a selectable range widget 148 that enables a user to specify a range for the score type in that column. For example, in the column corresponding to the positive score type, the range widget 148 has been selected, which causes a slider 150 to appear. Movable elements 152A, 152B on the slider 150 enable the user to specify a minimum value and a maximum value (a range) for that score type. When a range is specified, it is used to filter the entries in the table so that only those rows having values for that score type that fall within the specified range are shown in the data table 144, and all other rows are hidden. For example, the specified range for the positive score type is between 0.1028 and 0.1109. Only rows 2 (Microsoft), 3 (Google), 5 (Uber), 11 (Microsoft), and 13 (Google) have positive scores that fall within the specified range, so only those rows are shown and the other rows are hidden. A text box at the bottom of the data table 144 indicates how many of the rows in the data table 144 are currently shown versus the total number of rows in the data table 144. In this example, 5 rows out of 13 total rows are shown (meaning that the other 8 rows are hidden).

Figure 3:
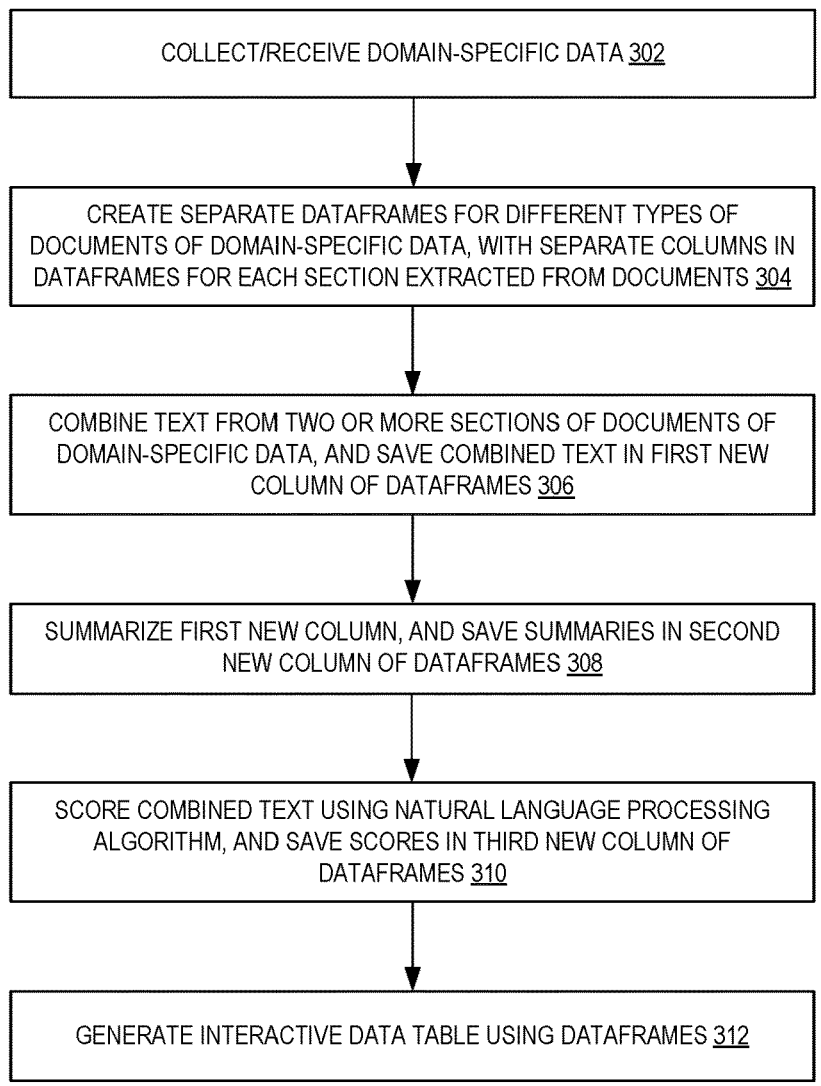
FIG. 3 is a process flow diagram illustrating operations of a method for generating TabText dataframes as input to an interactive data table according to some embodiments.

FIG. 3 is a process flow diagram illustrating operations 300 of a method for generating TabText dataframes 138 as input to an interactive data table 144 according to some embodiments. Some or all of the operations 300 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 300 are performed by service(s)/system(s) illustrated in other figures (e.g., the container service(s) 114, the storage service(s) 116, the model training system 120, the model hosting system 140, etc.).

The operations 300 include, at block 302, collecting/receiving domain-specific data. This aspect of some embodiments is discussed in detail above with reference to FIG. 1 and the operations shown at circles "1-3."

The operations 300 further include, at block 304, creating separate dataframes 136 for different types of documents of the domain-specific data, with separate columns in the dataframes 136 for each section extracted from the documents. This aspect of some embodiments is discussed in detail above with reference to FIG. 1 and the operations shown at circle "4."

The operations 300 further include, at block 306, combining text from two or more sections of at least some of the documents of the domain-specific data, and saving the combined text in a first new column of the dataframes, at block 308, summarizing the first new column, and saving the summaries in a second new column of the dataframes, and at block 310, scoring the combined text using a natural language processing algorithm, and saving the scores in a third new column of the dataframes. This aspect of some embodiments is discussed in detail above with reference to FIG. 1 and the operations shown at circle "5."

The operations 300 further include, at block 312, generating an interactive data table 144 using the dataframes generated according to the foregoing steps. This aspect of some embodiments is discussed in detail above with reference to FIG. 1 and the operations shown at circle "6."

As described above, ML training datasets are typically created manually using processes that are not only laborious and error-prone, but also require specialized knowledge and skills, such that they are also expensive. Embodiments described below solve this technical problem by providing an automated process for generating a domain-specific lexicon, which is then used to generate ML training datasets, in a manner that requires little to no human labor. In particular, some embodiments provide a simple and effective methodology for the generation of lexicons (word lists) that may be used in natural language scoring applications. In some technical spaces, word lists have become ubiquitous for sentiment scoring. These have been derived from dictionaries and require manual curation. Some of the present embodiments provide an automated approach to the curation of lexicons, which advantageously makes automatic preparation of any word list immediate. This process may be one step in a machine learning workflow according to some of the present embodiments. For example, in FIG. 1, the circles labeled "7"-"18" illustrate an example process for lexicon generation. This process is described in detail below.

Text-based numerical scores and features such as sentiment, readability, positivity, negativity, etc. play an important role in many research and practical applications. The existing practice is to derive word-based features from the input text by applying domain-specific dictionaries such as word lists. Word scoring-based numerical features are widely used in regression analysis of news articles, tweets, etc. The key, though, is where the word list comes from. The approach in the extant literature has been to rely on experts to create these word lists. But this approach introduces a degree of subjectivity and a lack of robustness. Moreover, as the number of concepts increase, and are represented differently over time, perhaps due to the evolution of language, and as expertise on different topics or even the same ones spread, the need arises for discipline and replicability in how the word lists are constructed. Some of the present embodiments bring discipline to the process of creating word lists for different concepts. First, some embodiments replace subjective choices of humans with a replicable algorithm. Since the algorithm is completely described and is easy to implement, it is replicable. Second, it can be refined by future modelers, and is therefore more easily developed and adapted. Third, it does not do away with the domain experts—it simply gives them a superior baseline on which their expertise can be used to refine the results. Finally, the role of experts is also more objective as what experts impose their views on becomes transparent. This makes the entire word list generation process transparent in ways that it has not been before.

In particular, some of the present embodiments provide a simple and scalable algorithm for generating word lists using pre-trained word embeddings, requiring no manual curation. Some embodiments facilitate generating word lists that provide support both for as well as against a concept. In this approach, the user simply provides a pair of words that are either synonyms or antonyms. If the words are synonyms, the algorithm generates two word lists with embeddings that are closest to the two words, intersects these lists with a dictionary to keep only the ones that are valid words, and then returns the union set of both word lists. Using the intersecting dictionary is an additional approach to triage the word lists before manual curation as it catches spelling errors, non-English words, etc. If the words are antonyms, the algorithm generates two word lists with embeddings that are closest to the two words, intersects these lists with a dictionary to keep only the ones that are valid words, and then returns two separate word lists. If a word appears in both lists, the algorithm keeps the word only in the list in which it has highest similarity. In short, with synonyms, the algorithm returns a single list (support for the concept) and with antonyms, it generates two lists (support for, as well as against, the concept).

Figure 4:
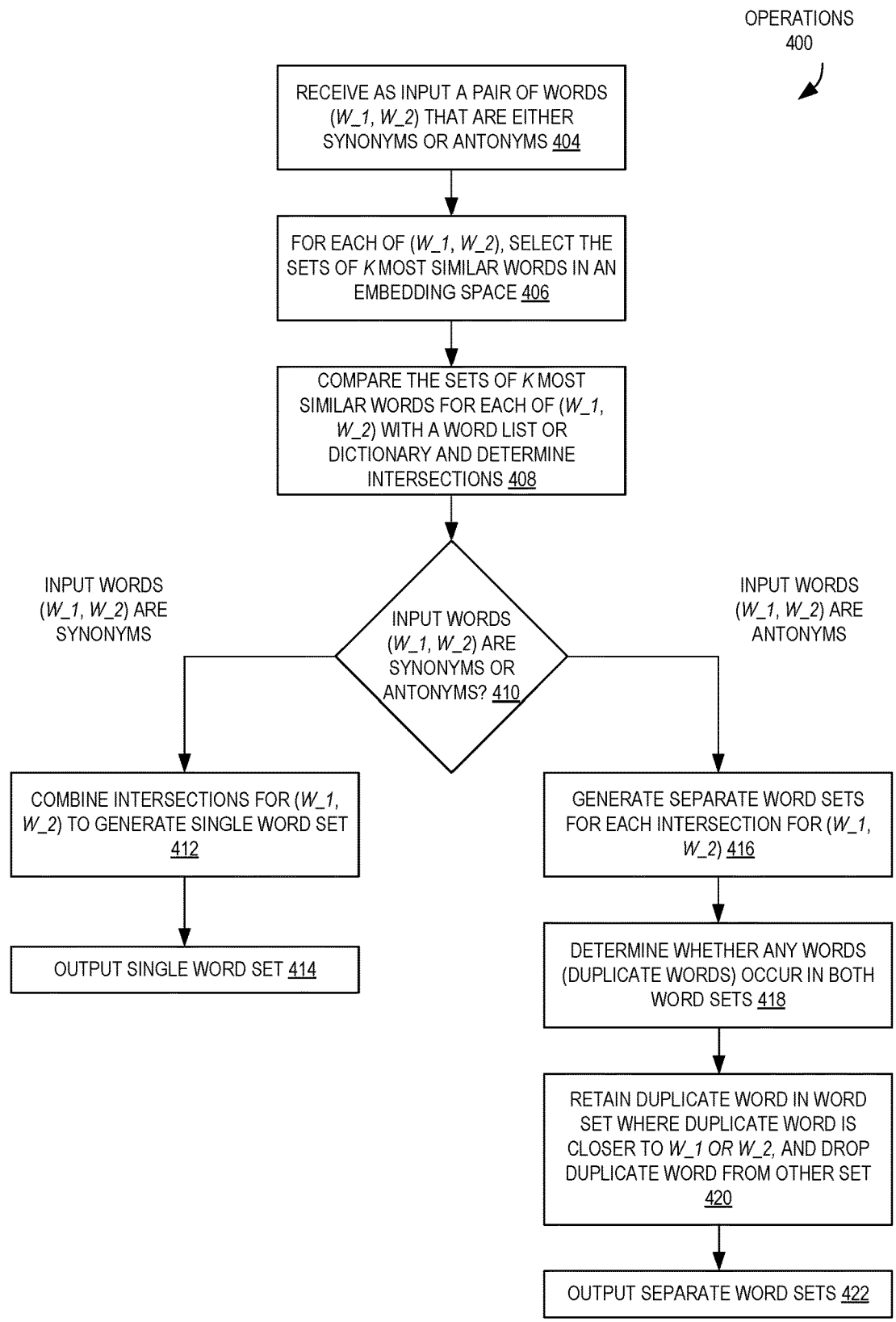
FIG. 4 is a process flow diagram illustrating operations of a method for generating a domain-specific lexicon, which can then be used to generate ML training datasets, according to some embodiments.

FIG. 4 is a process flow diagram illustrating operations 400 of a method for generating a domain-specific lexicon, which can then be used to generate ML training datasets, according to some embodiments. Some or all of the operations 400 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 400 are performed by service(s)/system(s) illustrated in other figures (e.g., the container service(s) 114, the storage service(s) 116, the model training system 120, the model hosting system 140, etc.). In some embodiments, the operations 400 may be used to generate the word list(s) used by the data extractor to score the combined text in the first new column of the dataframes (e.g., at block 312 of FIG. 3).

The operations 400 described below may leverage a set of word embeddings from a pretrained word embedding model, such as a pretrained word embedding model 156 stored at the storage service(s) 116, as shown at circle "7" in FIG. 1. Word embeddings are numerical vectors of fixed dimension D (e.g., 300) that represent each word. Thus, each word can be imagined as a point in D-dimensional space. The collection of unique words for which embeddings are generated is called the vocabulary, and the size of the vocabulary is denoted by V. Hence, the collection of word embeddings can be represented in a matrix of size V×D, which represents a projection of V words into D dimensions. Words related to the same concepts and context will reside closer to each other in this vector space. Non-limiting example sources for the pretrained word embedding model 156 include FastText from Facebook, Global Vectors (GloVe) from Stanford, and word2vec from Google. Each of these uses slightly different approaches to generate word embeddings from large text corpora (e.g., BOW (bag of words), SkipGram, GloVe, etc).

The operations 400 include, at block 404, receiving as input a pair of words ($w_1$, $w_2$) that are either synonyms or antonyms. For example, as shown at circle "8" in FIG. 1, the client device 122, operated by the user 118, may send the input words ($w_1$, $w_2$) to the API(s) 126 in the provider network 100. In some embodiments, the input words ($w_1$, $w_2$) may be received from a different source, such as a device and/or user within the provider network 100. The input words ($w_1$, $w_2$) may be received as input by a lexicon generator 154 as shown at circle "9." In some embodiments, the lexicon generator 154 may be executed within one of the processing containers 115, while in some embodiments the lexicon generator 154 may be a standalone set of instructions (e.g., computer code) hosted by and/or executed within the provider network 100.

The operations 400 further include, at block 406, for each of the input words ($w_1$, $w_2$), selecting the sets of K most similar words in the embedding space. For example, as shown at circle "10" in FIG. 1, the lexicon generator 154 may apply cosine similarity and/or Euclidean distance to the embedding space (e.g., the pretrained word embedding model 156) to determine the sets of K words that are most similar to each of the input words ($w_1$, $w_2$). In some embodiments, K may be set equal to 1,000, but in other embodiments K may be set equal to any value.

Cosine similarity is a measurement that quantifies the similarity between two or more vectors using the cosine of the angle between the vectors. The value of a cosine similarity is within the range between −1 and 1, where higher, positive values (closer to 1) indicate greater degrees of similarity, and lower, negative values (closer to −1) indicate greater degrees of dissimilarity. For example, if the angle between two vectors is 90 degrees, then the cosine similarity of the two vectors has a value of 0, indicating a low degree of similarity between the two vectors. If the angle between two vectors is 0 degrees, then the cosine similarity of the two vectors has a value of 1, indicating a high degree of similarity between the two vectors. If the angle between two vectors is 180 degrees, then the cosine similarity of the two vectors has a value of −1, indicating a high degree of dissimilarity between the two vectors. The cosine similarity is described mathematically as the division between the dot product of vectors and the product of the Euclidean norms or magnitude of each vector. In some embodiments, the cosine similarity of word embeddings can be used to determine the similarity between the two words, where the word embeddings are numerical vectors of fixed dimension D that represent each word (e.g., each word can be imagined as a point in D-dimensional space).

Euclidean distance between two points in Euclidean space is the length of a line segment between the two points. It can be calculated from the Cartesian coordinates of the points using the Pythagorean theorem. In some embodiments, the Euclidean distance between word embeddings can be used to determine the similarity between the two words, where the word embeddings are numerical vectors of fixed dimension D that represent each word (e.g., each word can be imagined as a point in D-dimensional space).

The operations 400 further include, at block 408, comparing the sets of K most similar words for each of the input words ($w_1$, $w_2$) with a word list or dictionary and determining intersections. For example, as shown at circle "11" in FIG. 1, the lexicon generator 154 may compare the sets of K most similar words for each of the input words ($w_1$, $w_2$) with a list of standard English words. One non-limiting example of the standard English words is the MIT word list. This step refines, or cleans up, the set of similar words by purging slang words, misspellings, and other irregular words.

The operations 400 further include, at block 410, determining whether the input words ($w_1$, $w_2$) are synonyms or antonyms. For example, as shown at circle "12" in FIG. 1, the lexicon generator 154 may make this determination. In some embodiments, this determination may be made using cosine similarity and/or Euclidean distance. In some embodiments, an indication of whether the input words ($w_1$, $w_2$) are synonyms or antonyms may be received as an input, such as from the client device 122, for example. In embodiments in which such an indication is received as an input, block 410 may comprise processing the input.

If the input words ($w_1$, $w_2$) are synonyms, then the operations 400 advance to block 412, where the intersections for the input words ($w_1$, $w_2$) are combined to generate a single word set 158. That is, the intersection between the first input word ($w_1$) and the word list or dictionary is combined with the intersection between the second input word ($w_2$) and the word list or dictionary. For example, as shown at circle "13" in FIG. 1, the lexicon generator 154 may perform this step. The operations 400 then advance to block 414, where the single word set 158 is output. For example, the single word set 158 may be output by the data extractor 132 and stored at the storage service(s) 116 as shown at circle "14" in FIG. 1, and/or to a local notebook instance (not shown) in the provider network 100.

However, if it is determined at block 410 that the input words ($w_1$, $w_2$) are antonyms, then the operations 400 advance to block 416, where separate word sets 158 are generated for the intersections for each of the input words ($w_1$, $w_2$). That is, a first word set 158A is generated for the intersection between the first input word ($w_1$) and the word list or dictionary, and a second word set 158B is generated for the intersection between the second input word ($w_2$) and the word list or dictionary. In some embodiments, each word set 158A, 158B is independently generated using cosine similarity. For example, as shown at circle "15" in FIG. 1, the lexicon generator 154 may perform this step. The operations 400 then advance to block 418, where it is determined whether any words (duplicate words) occur in both word sets 158A, 158B. For example, as shown at circle "16" in FIG. 1, the lexicon generator 154 may make this determination.

When it is determined that duplicate words occur in both word sets 158A, 158B, then at block 420 the duplicate words are retained in only one of the word sets 158 and purged from the other word set 158. In particular, a duplicate word is retained in the first word set 158A and purged from the second word set 158B when the duplicate word is closer in meaning to the first input word ($w_1$) than it is to the second input word ($w_2$). Conversely, a duplicate word is retained in the second word set 158B and purged from the first word set 158A when the duplicate word is closer in meaning to the second input word ($w_2$) than it is to the first input word ($w_1$). Cosine similarity and/or Euclidean distance may be used in some embodiments to determine similarities between words. For example, as shown at circle "17" in FIG. 1, the lexicon generator 154 may perform this step.

The duplicate word check at blocks 418, 420 ensures a word cannot be common to two opposing concepts. This is especially important when using word embeddings, because it is possible that words that are opposite in meaning to the concept word may also reside nearby in embedding space, since they are related to the concept word, even though they have an opposing connotation. For example, if the antonyms are war and peace, the word conflict may appear in both word sets, and if it closer to war (as it hopefully should be), then it will be removed from the word set based on the word peace. This is a simple check and balance on automated lexicon generation as it helps triage misclassified words.

The operations 400 further include, at block 422, where the separate word sets 158A, 158B are output. For example, the separate word sets 158A, 158B may be output by the data extractor 132 and stored at the storage service(s) 116 as shown at circle "18" in FIG. 1, and/or to a local notebook instance (not shown) in the provider network 100.

As described above, ML training data gathered from public sources (e.g., Wikipedia) typically contains errors (e.g., misspellings, grammar mistakes, misstatements of fact, improper word usage, etc.). Language models trained on such data are less likely to provide accurate inferences. Embodiments described in the present disclosure solve this technical problem by gathering ML training data from domain-specific public sources, which are more likely than typical public sources to contain focused terminology and to be free from the types of errors described above. The domain-specific training data is then used to retrain pre-trained language models, resulting in more accurate inferences. This process may be one step in a machine learning workflow according to some of the present embodiments. For example, in FIG. 1, the circles labeled "19"-"27" illustrate an example process for training an off-the-shelf language model with domain-specific text data. This process is described in detail below.

More particularly, some of the present embodiments train language models with domain-specific training data to create better language representations for features used in a predictive model. Some embodiments train RoBERTa-class models, from scratch, using a combination of domain-specific text data and one or more of the five RoBERTa datasets (BookCorpus, a dataset consisting of 11,038 unpublished books; English Wikipedia (excluding lists, tables, and headers); CC-News, a dataset containing 63 million English news articles crawled between September 2016 and February 2019; OpenWebText, an opensource recreation of the WebText dataset used to train GPT-2; and Stories, a dataset containing a subset of CommonCrawl data filtered to match the story-like style of Winograd schemas). Other embodiments retrain off-the-shelf RoBERTa-class models (models that have already been trained on one or more of the five RoBERTa datasets) using domain-specific text data. Either way, training RoBERTa-class models using domain-specific text data leads to material improvement over models that use only text-based numerical features (e.g., sentiment, readability, polarity), which is the traditional approach adopted in academia and practice. Language models according to some embodiments may outperform generic BERT-class models that are not trained with domain-specific text data. The improvement in classification accuracy is material, suggesting that full text and context are important in classifying domain-specific documents, and that the benefits from the use of mixed data, (e.g., enhancing numerical tabular data with text) are feasible and fruitful in machine learning models. For clarity, example embodiments are discussed below with reference to RoBERTa-class models, but the present embodiments are not limited to RoBERTa-class models. Some embodiments may pertain to other language models, such as various types of Transformer models (e.g., BERT, ALBERT, BORT, DistilBERT, etc.).

RoBERTa stands for Robustly Optimized BERT pre-training Approach. RoBERTa models optimize the training of BERT architecture to reduce pre-training time. RoBERTa has similar architecture to BERT, but includes some design changes in its architecture and training procedure, including removing the Next Sentence Prediction (NSP) objective, training with bigger batch sizes and longer sequences, and dynamically changing the masking pattern.

BERT (Bidirectional Encoder Representations from Transformers) is an open-source machine learning framework for natural language processing (NLP). BERT is designed to help computers understand the meaning of ambiguous language in text by using surrounding text to establish context. The BERT framework was pre-trained using text from Wikipedia, and can be fine-tuned with question-and-answer datasets. BERT is based on Transformers, a deep learning model in which every output element is connected to every input element, and the weightings between them are dynamically calculated based upon their connection. (In NLP, this process is called attention.)

Text is more versatile, extensive, and multifaceted than mere tabular (numerical) data. An advantage of word-based scoring to create numerical variables is that the dimension of the feature set remains small and supports simple, explainable methods such as regression analysis. But the addition of text to tabular data poses technical problems. One such problem is how to combine text and numerical tabular data in one predictive model. Another such problem is that language models such as BERT are easiest to apply to short text (e.g., a few sentences) and, in fact, work best at the single sentence level, but domain-specific text data for retraining such models may be much longer. Some of the present embodiments solve these technical problems, as described below.

In some embodiments, domain-specific text data is collected or received (e.g., downloaded) from one or more data repositories. This aspect of some embodiments may be similar to that described above with reference to FIG. 1, specifically the steps described in connection with circles "1"-"3." The domain-specific text data may be stored at the storage service(s) 116, as shown at circle "19" in FIG. 1.

The domain-specific text data 134 (e.g., documents) is then used, in combination with one or more of the five RoBERTa datasets, to train a RoBERTa model 160. In some embodiments, the training proceeds from scratch, in that the RoBERTa model 160 has not been pretrained on one or more of the five RoBERTa datasets. In other embodiments, the RoBERTa model 160 is an off-the-shelf model that has been pretrained on the five RoBERTa datasets. The model training system 120 may receive the RoBERTa model 160 from the model hosting system 140 as shown at circle "20" in FIG. 1, and receive the domain-specific text data 134 from the storage service(s) 116 as shown at circle "21" in FIG. 1. The RoBERTa model 160 may then be trained on the domain-specific text data 134 (and, in embodiments where the RoBERTa model 160 is not pretrained, also the five RoBERTa datasets). For example, as shown at circle "22" in FIG. 1, the model training system 120 may perform this step using one of the ML training container(s) 121. When training is complete, the language model that has been trained on the domain-specific text data 134 ("the pretrained domain-specific language model 162") may be output by the model training system 120 to the model hosting system 140 and stored at the model hosting system 140, as shown at circle "23" in FIG. 1.

In some embodiments, training the RoBERTa model 160 on the domain-specific text data 134 may include submitting entire documents to the RoBERTa model 160. In other embodiments, training the RoBERTa model 160 on the domain-specific text data 134 may include summarizing documents and then submitting the summaries to the RoBERTa model 160. For example, summarizing documents may include using a Jaccard summarizer and/or a k-medoids summarizer, which are described in detail above. In still further embodiments, the two foregoing approaches may be combined, such that a combination of entire documents and document summaries are submitted to the RoBERTa model 160.

Some of the present embodiments exploit transfer learning. That is, the pretrained domain-specific language model 162 is used to modify the text input and create embeddings that are then passed into one or more additional layers in a neural network for training the specific classification task, such as scoring sentiment into three categories. For example, the pretrained domain-specific language model 162 hosted at the model hosting system 140 may modify the text input and create the embeddings, which are then passed to one of the ML training container(s) 121, as shown at circle "24" in FIG. 1.

Embodiments may consider five different architectures (listed below) for comparison across all the language models and feed the embeddings for text from the language model into standard feed-forward neural net layers. Rather than feeding the embeddings for only the CLS (classification) token, as is done with standard BERT models, embodiments may apply average pooling to the embeddings for all tokens and submit that to the following architectures:

Configuration 1: one dense layer (e.g., 64 neurons)
Configuration 2: one dense layer (e.g., 128 neurons)
Configuration 3: two dense layers (e.g., 64 neurons in each layer)
Configuration 4: one dense layer (e.g., 64 neurons), one dropout layer (e.g., 0.5)
Configuration 5: one dense layer (e.g., 128 neurons), one dropout layer (e.g., 0.5)

For example, as shown at circles "25" and "26" in FIG. 1, the steps of applying average pooling to the embeddings and feeding the embeddings into one or more dense layers, with and without dropout, may be performed in one of the ML training container(s) 121 of the model training system 120 using the embeddings created by the pretrained domain-specific language model 162. In general, global average pooling is a pooling operation designed to replace fully connected layers in classical convolutional neural networks. The idea is to generate one feature map for each corresponding category of the classification task in the last MLP Conv layer. Instead of adding fully connected layers on top of the feature maps, global average pooling takes the average of each feature map, and the resulting vector is fed directly into the softmax layer. One advantage of global average pooling over the fully connected layers is that it is more native to the convolution structure by enforcing correspondences between feature maps and categories. Thus, the feature maps can be easily interpreted as categories confidence maps. Another advantage is that there is no parameter to optimize in the global average pooling, thus overfitting is avoided at this layer. Furthermore, global average pooling sums out the spatial information, thus it is more robust to spatial translations of the input.

In a neural network, a dense layer is a layer that is deeply connected with its preceding layer, which means the neurons of the dense layer are connected to every neuron of its preceding layer. Dense layers, also referred to as fully connected layers, are commonly used in artificial neural networks, and are typically used in the final stages of the neural network. The dense layer's neuron in a model receives output from every neuron of its preceding layer, where neurons of the dense layer perform matrix-vector multiplication. A dense layer helps in changing the dimensionality of the output from the preceding layer so that the model can easily define the relationship between the values of the data in which the model is working.

Dilution (also called dropout) is a regularization technique for reducing overfitting in artificial neural networks by preventing complex co-adaptations on training data. It is an efficient way of performing model averaging with neural networks. Dilution refers to the thinning of the weights, while dropout refers to randomly "dropping out," or omitting, units (both hidden and visible) during the training process of a neural network. Both the thinning of weights and dropping out units trigger the same type of regularization, and often the term dropout is used when referring to the dilution of weights.

Returning to the architectures listed above, some embodiments have a final dense output layer of three neurons for the final classification (e.g., scoring sentiment into three categories), though other embodiments may have any number of neurons for the final classification. As discussed above, the dropout layers help in managing overfitting. In some embodiments, a model may be trained for 100 epochs (or any other number of epochs) and the accuracy level of the model may be tested on a test dataset for 30, 50, or 100 epochs (or any other number of epochs). For example, as shown at circle "27" in FIG. 1, the final classification may be performed in one of the ML training container(s) 121 of the model training system 120.

Figure 5:
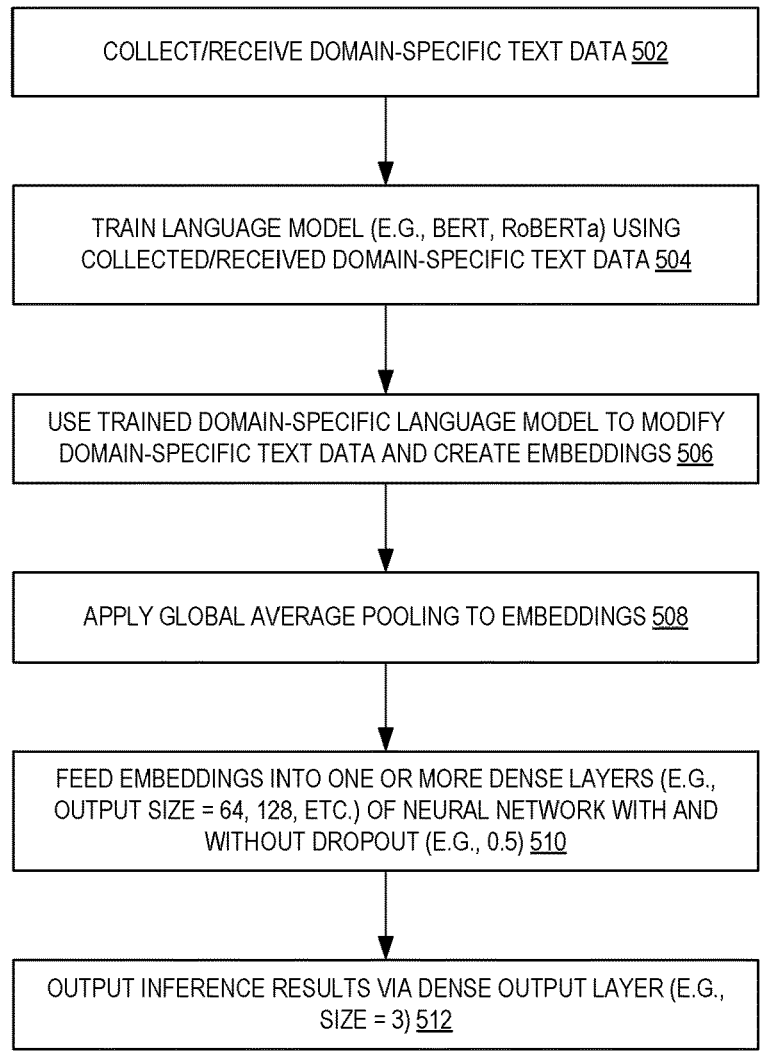
FIG. 5 is a process flow diagram illustrating operations of a method for training a domain-specific language model according to some embodiments.

FIG. 5 is a process flow diagram illustrating operations 500 of a method for training a domain-specific language model according to some embodiments. Some or all of the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 500 are performed by service(s)/system(s) illustrated in other figures (e.g., the container service(s) 114, the storage service(s) 116, the model training system 120, the model hosting system 140, etc.).

The operations 500 include, at block 502, collecting/receiving domain-specific text data 134. This aspect of some embodiments is discussed in detail above with reference to FIG. 1 and the operations shown at circles "1-3" and "19."

The operations 500 further include, at block 504, training a language model (e.g., BERT, RoBERTa) using the collected/received domain-specific text data 134. This aspect of some embodiments is discussed in detail above with reference to FIG. 1 and the operations shown at circles "20-23."

The operations 500 further include, at block 506, using the pretrained domain-specific language model 162 to modify domain-specific text data 134 and create embeddings. This aspect of some embodiments is discussed in detail above with reference to FIG. 1 and the operations shown at circle "24."

The operations 500 further include, at block 508, applying global average pooling to the embeddings. This aspect of some embodiments is discussed in detail above with reference to FIG. 1 and the operations shown at circle "25."

The operations 500 further include, at block 510, feeding the embeddings into one or more dense layers (e.g., output size=64, 128, etc.) of the neural network with and without dropout (e.g., 0.5). This aspect of some embodiments is discussed in detail above with reference to FIG. 1 and the operations shown at circle "26."

The operations 500 further include, at block 512, outputting inference results via a dense output layer (e.g., size=3). This aspect of some embodiments is discussed in detail above with reference to FIG. 1 and the operations shown at circle "27."

Figure 6:
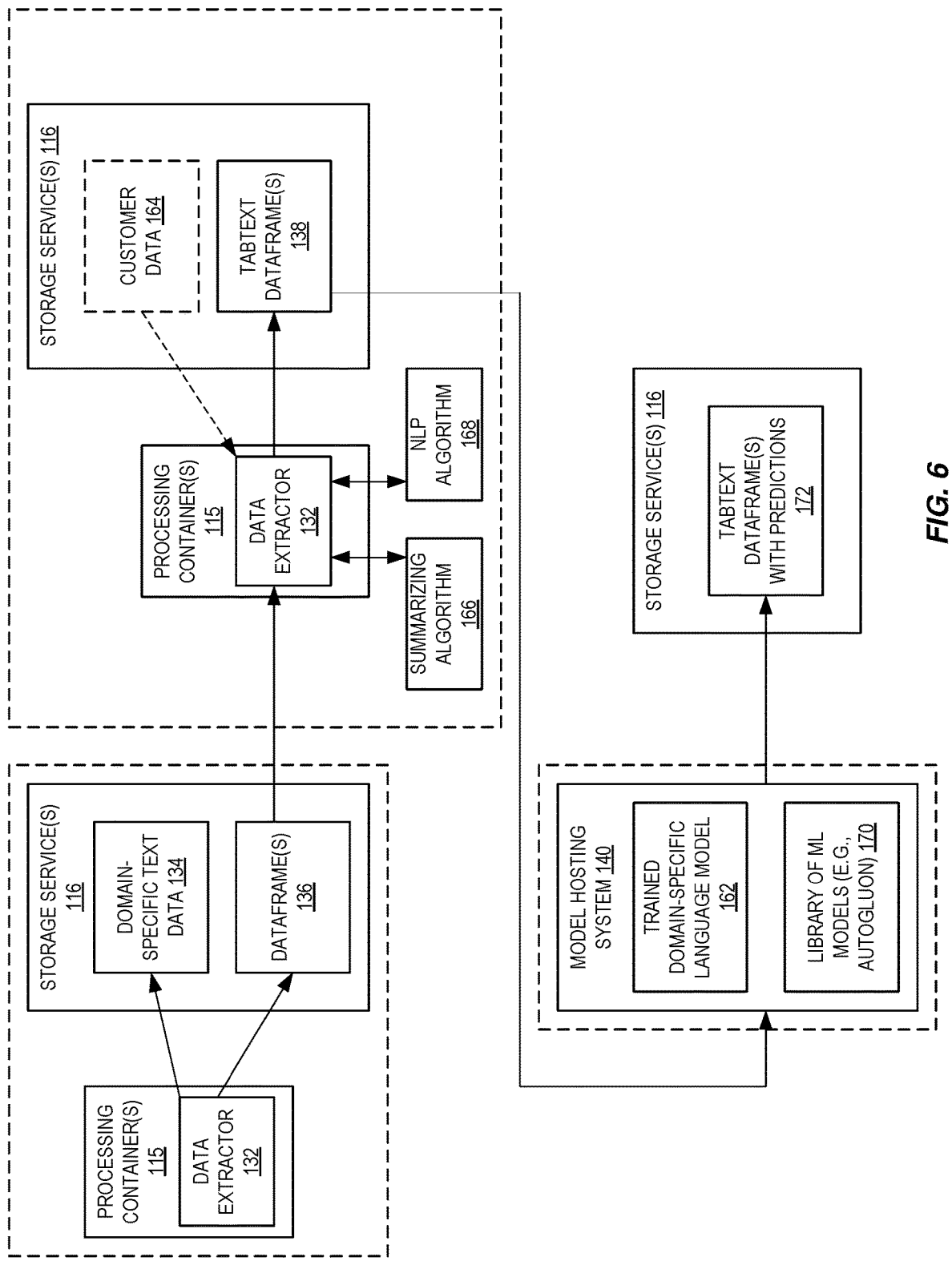
FIG. 6 is a functional block diagram illustrating a process flow for building, training, and deploying ML models according to some embodiments.

FIG. 6 illustrates a process flow for building, training, and deploying ML models according to some embodiments. The data extractor 132, executed within one of the processing containers 115, may receive domain-specific data and store the extracted data as domain-specific text data 134 at the storage service(s) 116. These aspects are described above in connection with FIG. 1, and particularly with reference to circles "1"-"3A." The data extractor 132 may convert the downloaded data into a dataframe format, and the dataframes 136 may be stored at the storage service(s) 116. These aspects are described above in connection with FIG. 1, and particularly with reference to circle "4."

The data extractor 132 may process the dataframes 136 and output TabText dataframe(s) 138, which may be stored at the storage service(s) 116. These aspects are described above in connection with FIG. 1, and particularly with reference to circle "5." As described above, the processing may include combining columns, summarizing columns using a summarizing algorithm 166 and adding the summaries to the dataframe as new columns, and/or scoring columns of the dataframes using a natural language processing (NLP) algorithm 168 and adding the scores to the dataframe as new columns. In some embodiments, the data extractor 132 may receive customer data 164, which may also be stored at the storage service(s) 116, and the customer data 164 may be processed with the dataframes 136 to produce the TabText dataframe(s) 138.

The TabText dataframe(s) 138 may be input to one or more ML models hosted at the model hosting system 140. For example, in some embodiments the TabText dataframe(s) 138 may be input to the pretrained domain-specific language model 162 hosted at the model hosting system 140. In such embodiments, the text portion of the TabText dataframe(s) 138 may be passed to an endpoint associated with the pretrained domain-specific language model 162, and the pretrained domain-specific language model 162 may return predictions as output. In another example, in some embodiments the TabText dataframe(s) 138 may be input to a library of ML models 170 (e.g., AutoGluon). In such embodiments, the TabText dataframe(s) 138 may be passed to an endpoint associated with the library of ML models 170. The library of ML models 170 may then fit the TabText dataframe(s) 138 to a best model and return predictions as output. In either of the foregoing two cases, an output of TabText dataframe(s) with predictions 172 may be stored at the storage service(s) 116. In some embodiments, an output from either of the pretrained domain-specific language model 162 or the library of ML models 170 may be predictions, but without the other columns of the TabText dataframe(s) 138.

Figure 8:
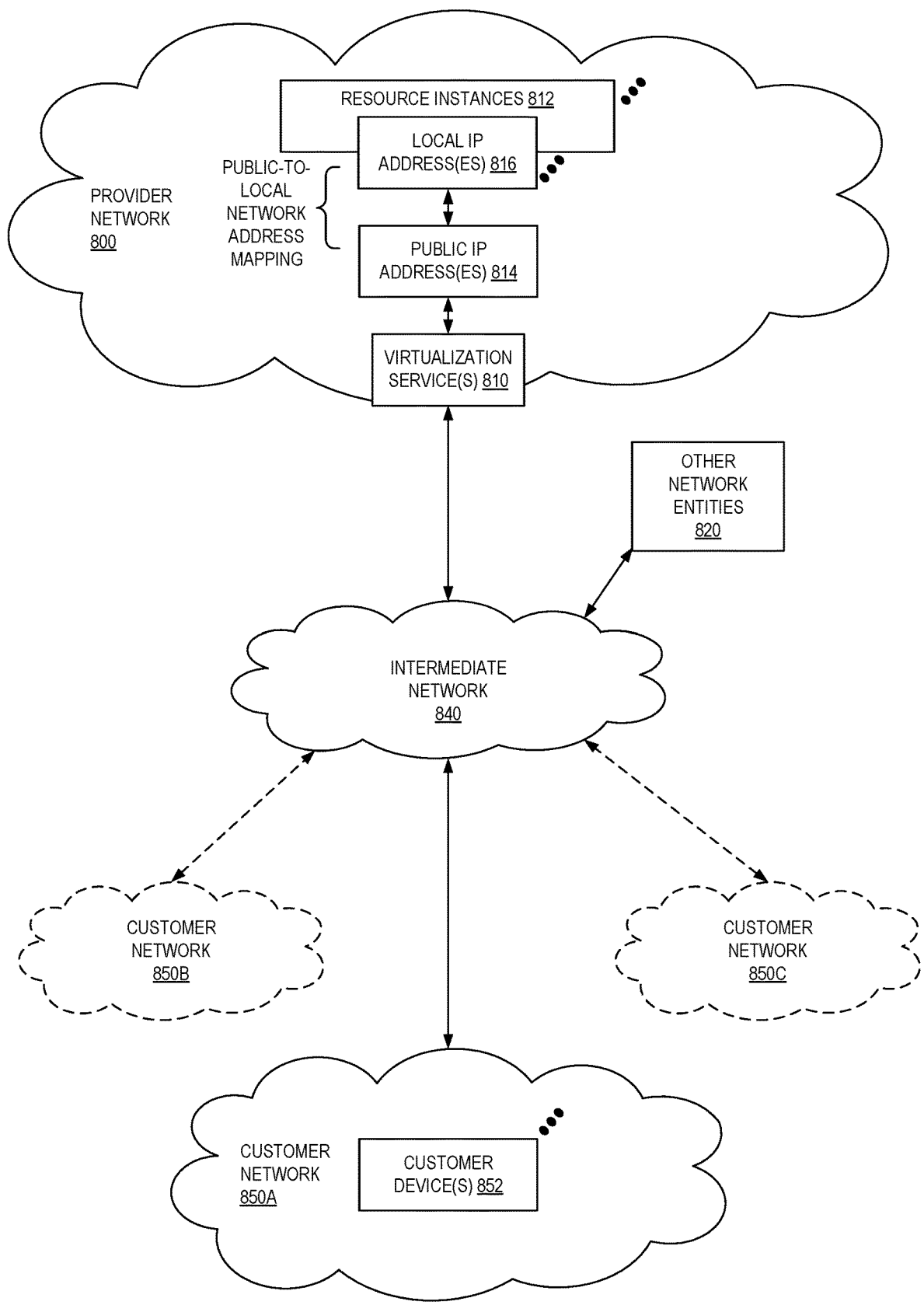
FIG. 8 illustrates an example provider network environment according to some embodiments.

FIG. 8 illustrates an example provider network (or "service provider system") environment according to some embodiments. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some embodiments, the provider network 800 can also provide public IP addresses 814 and/or public IP address ranges (e.g., Internet Protocol version 4 (IPv4) or Internet Protocol version 6 (IPv6) addresses) that customers can obtain from the provider 800.

Conventionally, the provider network 800, via the virtualization services 810, can allow a customer of the service provider (e.g., a customer that operates one or more customer networks 850A-850C (or "client networks") including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
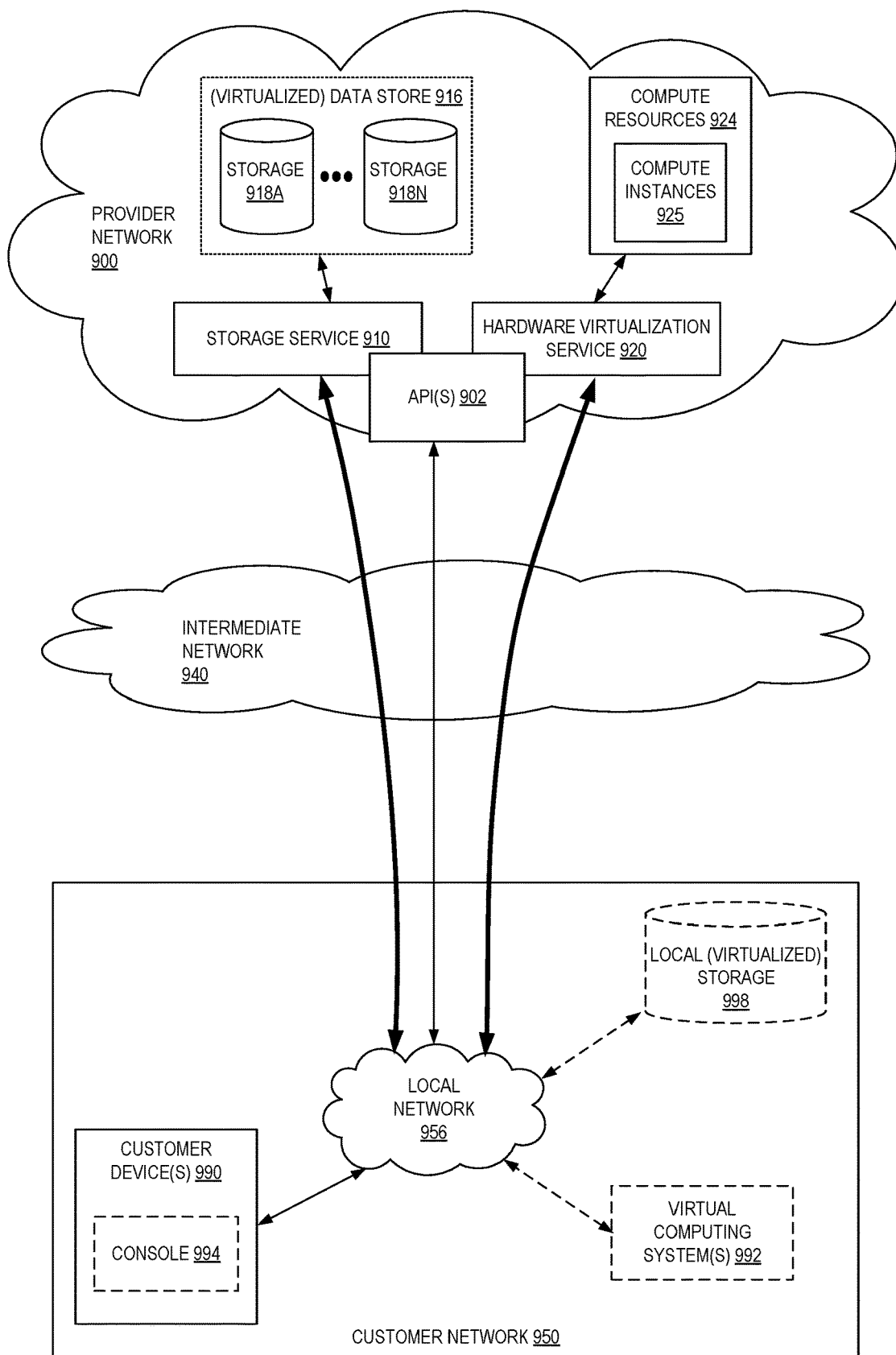
FIG. 9 is a block diagram of an example provider network that provides a storage service and a hardware virtualization service to customers according to some embodiments.

FIG. 9 is a block diagram of an example provider network environment that provides a storage service and a hardware virtualization service to customers, according to some embodiments. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some embodiments, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some embodiments, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some embodiments, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some embodiments, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Illustrative Systems

Figure 10:
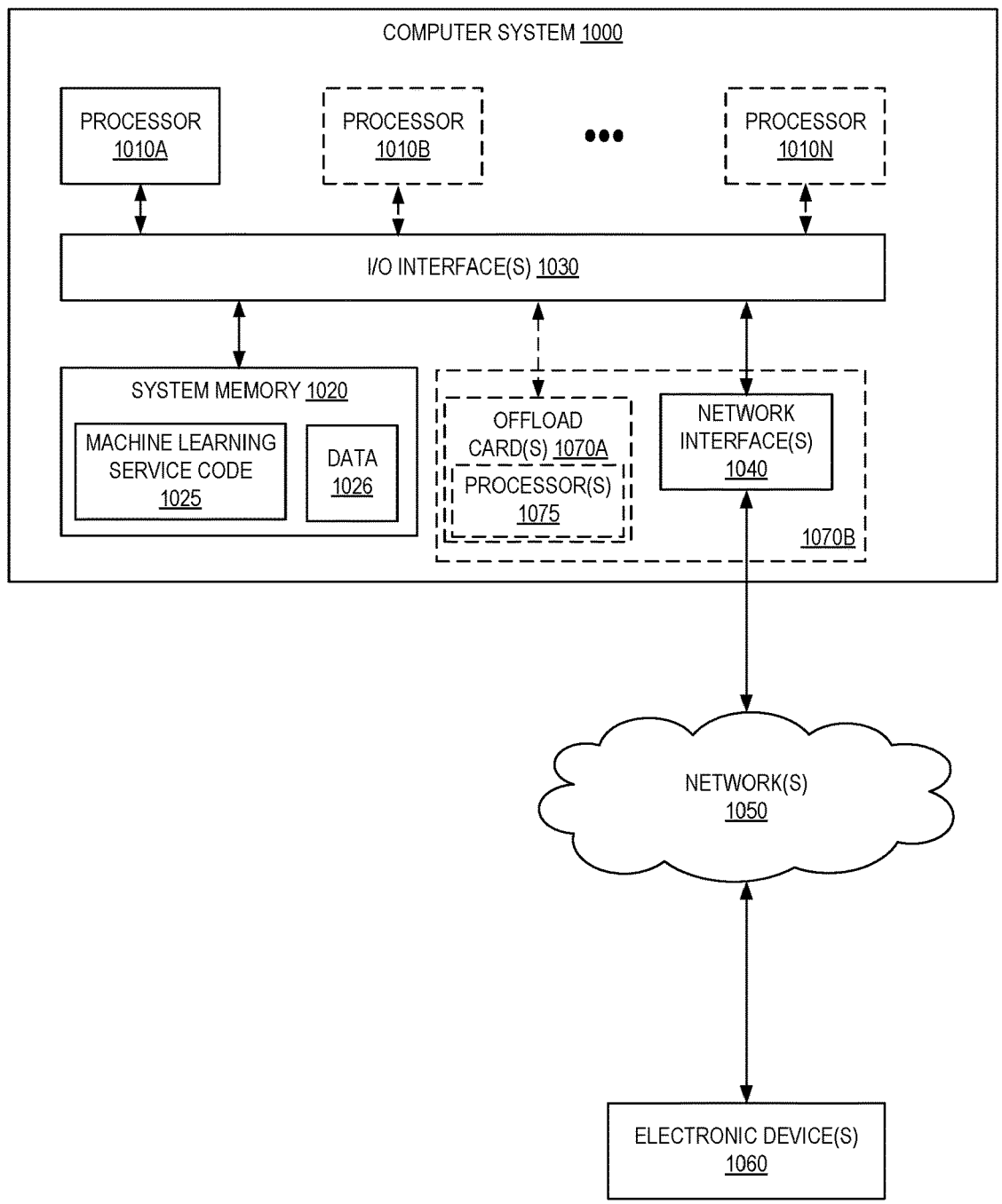
FIG. 10 is a block diagram illustrating an example computer system that can be used in some embodiments.

In some embodiments, a system that implements a portion or all of the techniques described herein can include a general-purpose computer system, such as the computer system 1000 illustrated in FIG. 10, that includes, or is configured to access, one or more computer-accessible media. In the illustrated embodiment, the computer system 1000 includes one or more processors 1010 coupled to a system memory 1020 via an input/output (I/O) interface 1030. The computer system 1000 further includes a network interface 1040 coupled to the I/O interface 1030. While FIG. 10 shows the computer system 1000 as a single computing device, in various embodiments the computer system 1000 can include one computing device or any number of computing devices configured to work together as a single computer system 1000.

In various embodiments, the computer system 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various embodiments, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various embodiments, the system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 1020 as machine learning service code 1025 (e.g., executable to implement, in whole or in part, the services/systems 114, 116, 120, 140) and data 1026.

In some embodiments, the I/O interface 1030 can be configured to coordinate I/O traffic between the processor 1010, the system memory 1020, and any peripheral devices in the device, including the network interface 1040 and/or other peripheral interfaces (not shown). In some embodiments, the I/O interface 1030 can perform any necessary protocol, timing, or other data transformations to convert data signals from one component (e.g., the system memory 1020) into a format suitable for use by another component (e.g., the processor 1010). In some embodiments, the I/O interface 1030 can include support for devices attached through various types of peripheral buses, such as a variant of the Peripheral Component Interconnect (PCI) bus standard or the Universal Serial Bus (USB) standard, for example. In some embodiments, the function of the I/O interface 1030 can be split into two or more separate components, such as a north bridge and a south bridge, for example. Also, in some embodiments, some or all of the functionality of the I/O interface 1030, such as an interface to the system memory 1020, can be incorporated directly into the processor 1010.

The network interface 1040 can be configured to allow data to be exchanged between the computer system 1000 and other devices 1060 attached to a network or networks 1050, such as other computer systems or devices as illustrated in FIG. 1, for example. In various embodiments, the network interface 1040 can support communication via any suitable wired or wireless general data networks, such as types of Ethernet network, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some embodiments the offload card(s) 1070A or 1070B can perform compute instance management operations, such as pausing and/or un-pausing compute instances, launching and/or terminating compute instances, performing memory transfer/copying operations, etc. These management operations can, in some embodiments, be performed by the offload card(s) 1070A or 1070B in coordination with a hypervisor (e.g., upon a request from a hypervisor) that is executed by the other processors 1010A-1010N of the computer system 1000. However, in some embodiments the virtualization manager implemented by the offload card(s) 1070A or 1070B can accommodate requests from other entities (e.g., from compute instances themselves), and can not coordinate with (or service) any separate hypervisor.

In some embodiments, the system memory 1020 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Figure 7:
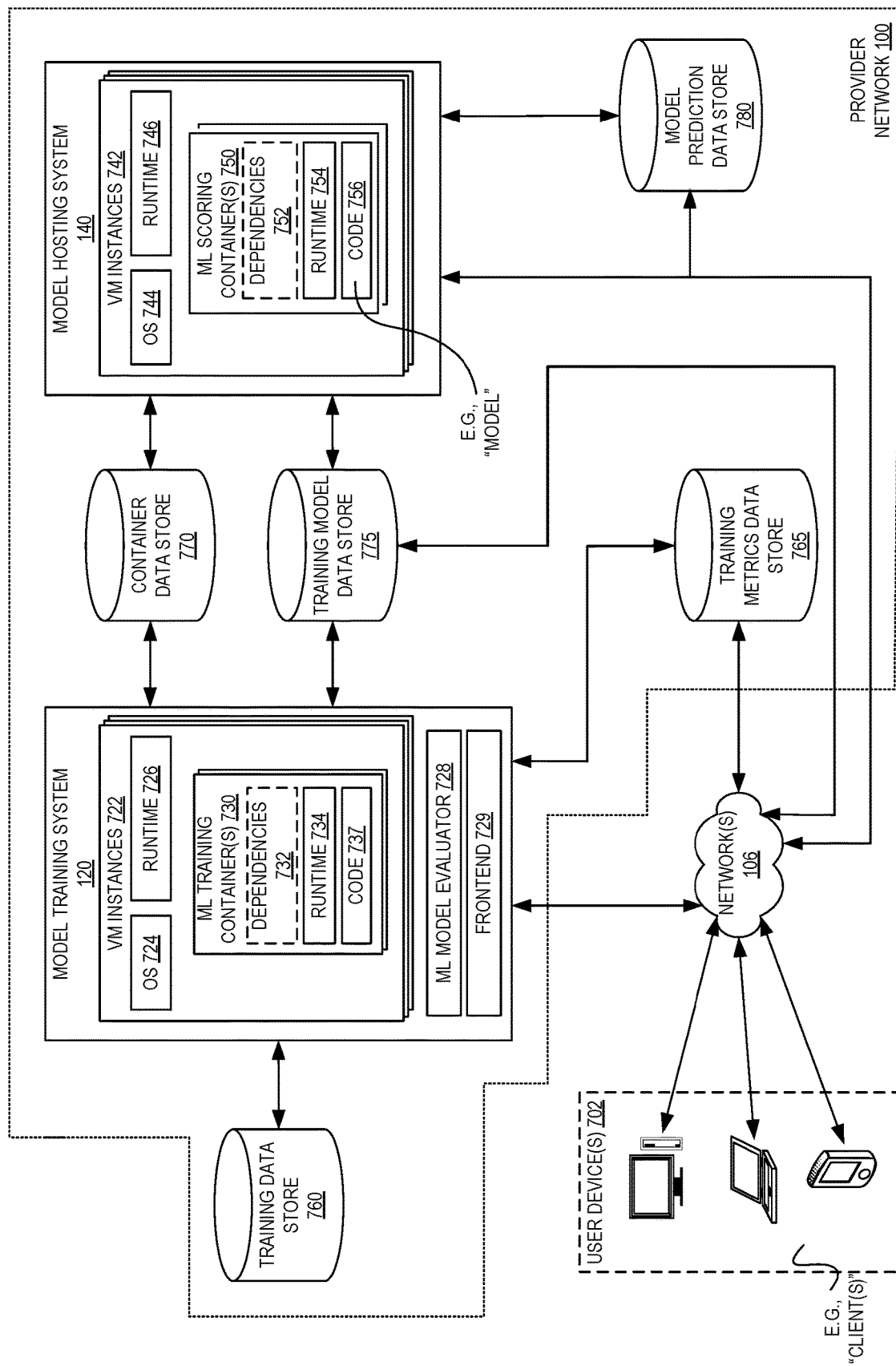
FIG. 7 is a functional block diagram illustrating an operating environment in which ML models are trained and hosted according to some embodiments.

FIG. 7 is a block diagram of an illustrative operating environment in which machine learning models are trained and hosted according to some embodiments. The operating environment includes end user devices 702 (for example, computing devices(s), edge device(s)), a model training system, a model hosting system, a training data store 760, a training metrics data store 765, a container data store 770, a training model data store 775, and a model prediction data store 780. A machine learning service described herein may include one or more of these entities, such as the model hosting system 140, the model training system 120, and so forth.

In some embodiments, users, by way of user devices 702, interact with the model training system 120 to provide data that causes the model training system 120 to train one or more machine learning models, for example, as described elsewhere herein. A machine learning model, generally, may be thought of as one or more equations that are "trained" using a set of data. In some embodiments, the model training system 120 provides ML functionalities as a web service, and thus messaging between user devices 702 and the model training system 120 (or provider network 100), and/or between components of the model training system 120 (or provider network 100), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 702 can interact with the model training system 120 via frontend 729 of the model training system 120. For example, a user device 702 can provide a training request to the frontend 729 that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device 702, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device 702 may provide, in the training request, an algorithm written in any programming language. The model training system 120 then packages the algorithm into a container (optionally with other code, such as a "base" ML algorithm supplemented with user-provided code) that is eventually loaded into a virtual machine instance 722 for training a machine learning model, as described in greater detail below. For example, a user, via a user device 702, may develop an algorithm/code using an application (for example, an interactive web-based programming environment) and cause the algorithm/code to be provided—perhaps as part of a training request (or referenced in a training request)—to the model training system 120, where this algorithm/code may be containerized on its own or used together with an existing container having a machine learning framework, for example.

In some embodiments, instead of providing a container image in the training request, the user device 702 provides, in the training request, an indicator of a container image (for example, an indication of an address or a location at which a container image is stored). For example, the container image can be stored in a container data store 770, and this container image may have been previously created/uploaded by the user. The model training system 120 can retrieve the container image from the indicated location and create a container using the retrieved container image. The container is then loaded into a virtual machine instance 722 for training a machine learning model, as described in greater detail below.

The model training system 120 can use the information provided by the user device 702 to train a machine learning model in one or more pre-established virtual machine instances 722 in some embodiments. In particular, the model training system 120 includes a single physical computing device or multiple physical computing devices that are interconnected using one or more computing networks (not shown), where the physical computing device(s) host one or more virtual machine instances 722. The model training system 120 can handle the acquisition and configuration of compute capacity (for example, containers, instances, etc., which are described in greater detail below) based on the information describing the computing machine on which to train a machine learning model provided by the user device 702. The model training system 120 can then train machine learning models using the compute capacity, as is described in greater detail below. The model training system 120 can automatically scale up and down based on the volume of training requests received from user devices 702 via frontend 729, thereby relieving the user from the burden of having to worry about over-usation (for example, acquiring too little computing resources and suffering performance issues) or under-usation (for example, acquiring more computing resources than necessary to train the machine learning models, and thus overpaying).

In some embodiments, the virtual machine instances 722 are used to execute tasks. For example, such tasks can include training a machine learning model. As shown in FIG. 7, each virtual machine instance 722 includes an operating system (OS) 724, a language runtime 726, and one or more ML training containers 730. Generally, the ML training containers 730 are logical units created within a virtual machine instance using the resources available on that instance and can be used to isolate execution of a task from other processes (for example, task executions) occurring in the instance. In some embodiments, the ML training containers 730 are formed from one or more container images and a top container layer. Each container image may further include one or more image layers, where each image layer represents an executable instruction. As described above, some or all of the executable instructions together represent an algorithm that defines a machine learning model. Changes made to the ML training containers 730 (for example, creation of new files, modification of existing files, deletion of files, etc.) are stored in the top container layer. If a ML training container 730 is deleted, the top container layer is also deleted. However, the container image(s) that form a portion of the deleted ML training container 730 can remain unchanged. The ML training containers 730 can be implemented, for example, as Linux containers (LXC), Docker containers, and the like.

The ML training containers 730 may include individual a runtime 734, code 737, and dependencies 732 needed by the code 737 in some embodiments. The runtime 734 can be defined by one or more executable instructions that form at least a portion of a container image that is used to form the ML training container 730 (for example, the executable instruction(s) in the container image that define the operating system and/or runtime to run in the container formed from the container image). The code 737 includes one or more executable instructions that form at least a portion of a container image that is used to form the ML training container 730. For example, the code 737 includes the executable instructions in the container image that represent an algorithm that defines a machine learning model, which may reference (or use) code or libraries from dependencies 732. The runtime 734 is configured to execute the code 737 in response to an instruction to begin machine learning model training. Execution of the code 737 results in the generation of model data, as described in greater detail below.

In some embodiments, the code 737 includes executable instructions that represent algorithms that define different machine learning models. For example, the code 737 includes one set of executable instructions that represent a first algorithm that defines a first machine learning model and a second set of executable instructions that represent a second algorithm that defines a second machine learning model. In some embodiments, the virtual machine instance 722 executes the code 737 and trains all of the machine learning models. In some embodiments, the virtual machine instance 722 executes the code 737, selecting one of the machine learning models to train. For example, the virtual machine instance 722 can identify a type of training data indicated by the training request and select a machine learning model to train (for example, execute the executable instructions that represent an algorithm that defines the selected machine learning model) that corresponds with the identified type of training data.

In some embodiments, the runtime 734 is the same as the runtime 726 used by the virtual machine instance 722. In some embodiments, the runtime 734 is different than the runtime 726 used by the virtual machine instance 722.

In some embodiments, the model training system 120 uses one or more container images included in a training request (or a container image retrieved from the container data store 770 in response to a received training request) to create and initialize a ML training container 730 in a virtual machine instance 722. For example, the model training system 120 creates a ML training container 730 that includes the container image(s) and/or a top container layer.

Prior to beginning the training process, in some embodiments, the model training system 120 retrieves training data from the location indicated in the training request. For example, the location indicated in the training request can be a location in the training data store 760. Thus, the model training system 120 retrieves the training data from the indicated location in the training data store 760. In some embodiments, the model training system 120 does not retrieve the training data prior to beginning the training process. Rather, the model training system 120 streams the training data from the indicated location during the training process. For example, the model training system 120 can initially retrieve a portion of the training data and provide the retrieved portion to the virtual machine instance 722 training the machine learning model. Once the virtual machine instance 722 has applied and used the retrieved portion or once the virtual machine instance 722 is about to use all of the retrieved portion (for example, a buffer storing the retrieved portion is nearly empty), then the model training system 120 can retrieve a second portion of the training data and provide the second retrieved portion to the virtual machine instance 722, and so on.

To perform the machine learning model training, the virtual machine instance 722 executes code 737 stored in the ML training container 730 in some embodiments. For example, the code 737 includes some or all of the executable instructions that form the container image of the ML training container 730 initialized therein. Thus, the virtual machine instance 722 executes some or all of the executable instructions that form the container image of the ML training container 730 initialized therein to train a machine learning model. The virtual machine instance 722 executes some or all of the executable instructions according to the hyperparameter values included in the training request. As an illustrative example, the virtual machine instance 722 trains a machine learning model by identifying values for certain parameters (for example, coefficients, weights, centroids, etc.). The identified values depend on hyperparameters that define how the training is performed. Thus, the virtual machine instance 722 can execute the executable instructions to initiate a machine learning model training process, where the training process is run using the hyperparameter values included in the training request. Execution of the executable instructions can include the virtual machine instance 722 applying the training data retrieved by the model training system 120 as input parameters to some or all of the instructions being executed.

In some embodiments, executing the executable instructions causes the virtual machine instance 722 (for example, the ML training container 730) to generate model data. For example, the ML training container 730 generates model data and stores the model data in a file system of the ML training container 730. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 730 such that the model data is written to the top container layer of the ML training container 730 and/or the container image(s) that forms a portion of the ML training container 730 is modified to include the model data.

The virtual machine instance 722 (or the model training system 120 itself) pulls the generated model data from the ML training container 730 and stores the generated model data in the training model data store 775 in an entry associated with the virtual machine instance 722 and/or the machine learning model being trained. In some embodiments, the virtual machine instance 722 generates a single file that includes model data and stores the single file in the training model data store 775. In some embodiments, the virtual machine instance 722 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 722 can package the multiple files into a single file once training is complete and store the single file in the training model data store 775. Alternatively, the virtual machine instance 722 stores the multiple files in the training model data store 775. The virtual machine instance 722 stores the file(s) in the training model data store 775 while the training process is ongoing and/or after the training process is complete.

In some embodiments, the virtual machine instance 722 regularly stores model data file(s) in the training model data store 775 as the training process is ongoing. Thus, model data file(s) can be stored in the training model data store 775 at different times during the training process. Each set of model data files corresponding to a particular time or each set of model data files present in the training model data store 775 as of a particular time could be checkpoints that represent different versions of a partially-trained machine learning model during different stages of the training process. Accordingly, before training is complete, a user, via the user device 702 can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 775.

In some embodiments, a virtual machine instance 722 executes code 737 stored in a plurality of ML training containers 730. For example, the algorithm included in the container image can be in a format that allows for the parallelization of the training process. Thus, the model training system 120 can create multiple copies of the container image provided in a training request and cause the virtual machine instance 722 to load each container image copy in a separate ML training container 730. The virtual machine instance 722 can then execute, in parallel, the code 737 stored in the ML training containers 730. The virtual machine instance 722 can further provide configuration information to each ML training container 730 (for example, information indicating that N ML training containers 730 are collectively training a machine learning model and that a particular ML training container 730 receiving the configuration information is ML training container 730 number X of N), which can be included in the resulting model data. By parallelizing the training process, the model training system 120 can significantly reduce the training time in some embodiments.

In some embodiments, a plurality of virtual machine instances 722 execute code 737 stored in a plurality of ML training containers 730. For example, the resources used to train a particular machine learning model can exceed the limitations of a single virtual machine instance 722. However, the algorithm included in the container image can be in a format that allows for the parallelization of the training process. Thus, the model training system 120 can create multiple copies of the container image provided in a training request, initialize multiple virtual machine instances 722, and cause each virtual machine instance 722 to load a container image copy in one or more separate ML training containers 730. The virtual machine instances 722 can then each execute the code 737 stored in the ML training containers 730 in parallel. The model training system 120 can further provide configuration information to each ML training container 730 via the virtual machine instances 722 (for example, information indicating that N ML training containers 730 are collectively training a machine learning model and that a particular ML training container 730 receiving the configuration information is ML training container 730 number X of N, information indicating that M virtual machine instances 722 are collectively training a machine learning model and that a particular ML training container 730 receiving the configuration information is initialized in virtual machine instance 722 number Y of M, etc.), which can be included in the resulting model data. As described above, by parallelizing the training process, the model training system 120 can significantly reduce the training time in some embodiments.

In some embodiments, the model training system 120 includes a plurality of physical computing devices and two or more of the physical computing devices hosts one or more virtual machine instances 722 that execute the code 737. Thus, the parallelization can occur over different physical computing devices in addition to over different virtual machine instances 722 and/or ML training containers 730.

In some embodiments, the model training system 120 includes a ML model evaluator 728. The ML model evaluator 728 can monitor virtual machine instances 722 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 728 can obtain the model data for a machine learning model being trained and evaluation data from the training data store 760. The evaluation data is separate from the data used to train a machine learning model and includes both input data and expected outputs (for example, known results), and thus the ML model evaluator 728 can define a machine learning model using the model data and execute the machine learning model by providing the input data as inputs to the machine learning model. The ML model evaluator 728 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 728 periodically generates model metrics during the training process and stores the model metrics in the training metrics data store 765 in some embodiments. While the machine learning model is being trained, a user, via the user device 702, can access and retrieve the model metrics from the training metrics data store 765. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device 702, can transmit a request to the model training system 120 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 120 can modify the machine learning model accordingly. For example, the model training system 120 can cause the virtual machine instance 722 to optionally delete an existing ML training container 730, create and initialize a new ML training container 730 using some or all of the information included in the request, and execute the code 737 stored in the new ML training container 730 to restart the machine learning model training process. As another example, the model training system 120 can cause the virtual machine instance 722 to modify the execution of code stored in an existing ML training container 730 according to the data provided in the modification request. In some embodiments, the user, via the user device 702, can transmit a request to the model training system 120 to stop the machine learning model training process. The model training system 120 can then instruct the virtual machine instance 722 to delete the ML training container 730 and/or to delete any model data stored in the training model data store 775.

As described below, in some embodiments, the model data stored in the training model data store 775 is used by the model hosting system 140 to deploy machine learning models. Alternatively or additionally, a user device 702 or another computing device (not shown) can retrieve the model data from the training model data store 775 to implement a learning algorithm in an external device. As an illustrative example, a robotic device can include sensors to capture input data. A user device 702 can retrieve the model data from the training model data store 775 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 722 are shown in FIG. 7 as a single grouping of virtual machine instances 722, some embodiments of the present application separate virtual machine instances 722 that are actively assigned to execute tasks from those virtual machine instances 722 that are not actively assigned to execute tasks. For example, those virtual machine instances 722 actively assigned to execute tasks are grouped into an "active pool," while those virtual machine instances 722 not actively assigned to execute tasks are placed within a "warming pool." In some embodiments, those virtual machine instances 722 within the warming pool can be pre-initialized with an operating system, language runtimes, and/or other software required to enable rapid execution of tasks (for example, rapid initialization of machine learning model training in ML training container(s) 730) in response to training requests.

In some embodiments, the model training system 120 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model hosting system 140, etc.). The processing unit can also communicate to and from a memory of a virtual machine instance 722 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 140 includes a single physical computing device or multiple physical computing devices that are interconnected using one or more computing networks (not shown), where the physical computing device(s) host one or more virtual machine instances 742. The model hosting system 140 can handle the acquisition and configuration of compute capacity (for example, containers, instances, etc.) based on demand for the execution of trained machine learning models. The model hosting system 140 can then execute machine learning models using the compute capacity, as is described in greater detail below. The model hosting system 140 can automatically scale up and down based on the volume of execution requests received from user devices 702 via frontend 749 of the model hosting system 140, thereby relieving the user from the burden of having to worry about over-usation (for example, acquiring too little computing resources and suffering performance issues) or under-usation (for example, acquiring more computing resources than necessary to run the machine learning models, and thus overpaying).

In some embodiments, the virtual machine instances 742 are used to execute tasks. For example, such tasks can include executing a machine learning model. As shown in FIG. 7, each virtual machine instance 742 includes an operating system (OS) 744, a language runtime 746, and one or more ML scoring containers 750. The ML scoring containers 750 are similar to the ML training containers 730 in that the ML scoring containers 750 are logical units created within a virtual machine instance using the resources available on that instance and can be used to isolate execution of a task from other processes (for example, task executions) occurring in the instance. In some embodiments, the ML scoring containers 750 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 750 (for example, creation of new files, modification of existing files, deletion of files, etc.) are stored in the top container layer. If a ML scoring container 750 is deleted, the top container layer is also deleted. However, the container image(s) that form a portion of the deleted ML scoring container 750 can remain unchanged. The ML scoring containers 750 can be implemented, for example, as Linux containers.

The ML scoring containers 750 each include a runtime 754, code 756, and dependencies 752 (for example, supporting software such as libraries) needed by the code 756 in some embodiments. The runtime 754 can be defined by one or more executable instructions that form at least a portion of a container image that is used to form the ML scoring container 750 (for example, the executable instruction(s) in the container image that define the operating system and/or runtime to run in the container formed from the container image). The code 756 includes one or more executable instructions that form at least a portion of a container image that is used to form the ML scoring container 750. For example, the code 756 includes the executable instructions in the container image that represent an algorithm that defines a machine learning model, which may reference dependencies 752. The code 756 can also include model data that represent characteristics of the defined machine learning model, as described in greater detail below. The runtime 754 is configured to execute the code 756 in response to an instruction to begin execution of a machine learning model. Execution of the code 756 results in the generation of outputs (for example, predicted results), as described in greater detail below.

In some embodiments, the runtime 754 is the same as the runtime 746 used by the virtual machine instance 742. In some embodiments, runtime 754 is different than the runtime 746 used by the virtual machine instance 742.

In some embodiments, the model hosting system 140 uses one or more container images included in a deployment request (or a container image retrieved from the container data store 770 in response to a received deployment request) to create and initialize a ML scoring container 750 in a virtual machine instance 742. For example, the model hosting system 140 creates a ML scoring container 750 that includes the container image(s) and/or a top container layer.

As described above, a user device 702 can submit a deployment request and/or an execution request to the model hosting system 140 via the frontend 749 in some embodiments. A deployment request causes the model hosting system 140 to deploy a trained machine learning model into a virtual machine instance 742. For example, the deployment request can include an identification of an endpoint (for example, an endpoint name, such as an HTTP endpoint name) and an identification of one or more trained machine learning models (for example, a location of one or more model data files stored in the training model data store 775). Optionally, the deployment request also includes an identification of one or more container images stored in the container data store 770.

Upon receiving the deployment request, the model hosting system 140 initializes ones or more ML scoring containers 750 in one or more hosted virtual machine instance 742. In embodiments in which the deployment request includes an identification of one or more container images, the model hosting system 140 forms the ML scoring container(s) 750 from the identified container image(s). For example, a container image identified in a deployment request can be the same container image used to form an ML training container 730 used to train the machine learning model corresponding to the deployment request. Thus, the code 756 of the ML scoring container(s) 750 includes one or more executable instructions in the container image(s) that represent an algorithm that defines a machine learning model. In embodiments in which the deployment request does not include an identification of a container image, the model hosting system 140 forms the ML scoring container(s) 750 from one or more container images stored in the container data store 770 that are appropriate for executing the identified trained machine learning model(s). For example, an appropriate container image can be a container image that includes executable instructions that represent an algorithm that defines the identified trained machine learning model(s).

The model hosting system 140 further forms the ML scoring container(s) 750 by retrieving model data corresponding to the identified trained machine learning model(s) in some embodiments. For example, the deployment request can identify a location of model data file(s) stored in the training model data store 775. In embodiments in which a single model data file is identified in the deployment request, the model hosting system 140 retrieves the identified model data file from the training model data store 775 and inserts the model data file into a single ML scoring container 750, which forms a portion of code 756. In some embodiments, the model data file is archived or compressed (for example, formed from a package of individual files). Thus, the model hosting system 140 unarchives or decompresses the model data file to obtain multiple individual files and inserts the individual files into the ML scoring container 750. In some embodiments, the model hosting system 140 stores the model data file in the same location as the location in which the model data file was stored in the ML training container 730 that generated the model data file. For example, the model data file initially was stored in the top container layer of the ML training container 730 at a certain offset, and the model hosting system 140 then stores the model data file in the top container layer of the ML scoring container 750 at the same offset.

In embodiments in which multiple model data files are identified in the deployment request, the model hosting system 140 retrieves the identified model data files from the training model data store 775. The model hosting system 140 can insert the model data files into the same ML scoring container 750, into different ML scoring containers 750 initialized in the same virtual machine instance 742, or into different ML scoring containers 750 initialized in different virtual machine instances 742. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 140 associates the initialized ML scoring container(s) 750 with the endpoint identified in the deployment request. For example, each of the initialized ML scoring container(s) 750 can be associated with a network address. The model hosting system 140 can map the network address(es) to the identified endpoint, and the model hosting system 140 or another system (for example, a routing system, not shown) can store the mapping. Thus, a user device 702 can refer to trained machine learning model(s) stored in the ML scoring container(s) 750 using the endpoint. This allows for the network address of an ML scoring container 750 to change without causing the user operating the user device 702 to change the way in which the user refers to a trained machine learning model.

Once the ML scoring container(s) 750 are initialized, the ML scoring container(s) 750 are ready to execute trained machine learning model(s). In some embodiments, the user device 702 transmits an execution request to the model hosting system 140 via the frontend 749, where the execution request identifies an endpoint and includes an input to a machine learning model (for example, a set of input data). The model hosting system 140 or another system (for example, a routing system, not shown) can obtain the execution request, identify the ML scoring container(s) 750 corresponding to the identified endpoint, and route the input to the identified ML scoring container(s) 750.

In some embodiments, a virtual machine instance 742 executes the code 756 stored in an identified ML scoring container 750 in response to the model hosting system 140 receiving the execution request. In particular, execution of the code 756 causes the executable instructions in the code 756 corresponding to the algorithm to read the model data file stored in the ML scoring container 750, use the input included in the execution request as an input parameter, and generate a corresponding output. As an illustrative example, the algorithm can include coefficients, weights, layers, cluster centroids, and/or the like. The executable instructions in the code 756 corresponding to the algorithm can read the model data file to determine values for the coefficients, weights, layers, cluster centroids, and/or the like. The executable instructions can include input parameters, and the input included in the execution request can be supplied by the virtual machine instance 742 as the input parameters. With the machine learning model characteristics and the input parameters provided, execution of the executable instructions by the virtual machine instance 742 can be completed, resulting in an output.

In some embodiments, the virtual machine instance 742 stores the output in the model prediction data store 780. Alternatively or in addition, the virtual machine instance 742 transmits the output to the user device 702 that submitted the execution result via the frontend 749.

In some embodiments, the execution request corresponds to a group of related trained machine learning models. Thus, the ML scoring container 750 can transmit the output to a second ML scoring container 750 initialized in the same virtual machine instance 742 or in a different virtual machine instance 742. The virtual machine instance 742 that initialized the second ML scoring container 750 can then execute second code 756 stored in the second ML scoring container 750, providing the received output as an input parameter to the executable instructions in the second code 756. The second ML scoring container 750 further includes a model data file stored therein, which is read by the executable instructions in the second code 756 to determine values for the characteristics defining the machine learning model. Execution of the second code 756 results in a second output. The virtual machine instance 742 that initialized the second ML scoring container 750 can then transmit the second output to the model prediction data store 780 and/or the user device 702 via the frontend 749 (for example, if no more trained machine learning models are needed to generate an output) or transmit the second output to a third ML scoring container 750 initialized in the same or different virtual machine instance 742 (for example, if outputs from one or more additional trained machine learning models are needed), and the above-referenced process can be repeated with respect to the third ML scoring container 750.

While the virtual machine instances 742 are shown in FIG. 7 as a single grouping of virtual machine instances 742, some embodiments of the present application separate virtual machine instances 742 that are actively assigned to execute tasks from those virtual machine instances 742 that are not actively assigned to execute tasks. For example, those virtual machine instances 742 actively assigned to execute tasks are grouped into an "active pool," while those virtual machine instances 742 not actively assigned to execute tasks are placed within a "warming pool." In some embodiments, those virtual machine instances 742 within the warming pool can be pre-initialized with an operating system, language runtimes, and/or other software required to enable rapid execution of tasks (for example, rapid initialization of ML scoring container(s) 750, rapid execution of code 756 in ML scoring container(s), etc.) in response to deployment and/or execution requests.

In some embodiments, the model hosting system 140 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model training system 120, etc.). The processing unit can also communicate to and from a memory of a virtual machine instance 742 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 120 and the model hosting system 140 depicted in FIG. 7 are not meant to be limiting. For example, the model training system 120 and/or the model hosting system 140 could also operate within a computing environment having a fewer or greater number of devices than are illustrated in FIG. 7. Thus, the depiction of the model training system 120 and/or the model hosting system 140 in FIG. 7 may be taken as illustrative and not limiting to the present disclosure. For example, the model training system 120 and/or the model hosting system 140 or various constituents thereof could implement various web services components, hosted or "cloud" computing environments, and/or peer-to-peer network configurations to implement at least a portion of the processes described herein. In some embodiments, the model training system 120 and/or the model hosting system 140 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 729 processes all training requests received from user devices 702 and provisions virtual machine instances 722. In some embodiments, the frontend 729 serves as a front door to all the other services provided by the model training system 120. The frontend 729 processes the requests and makes sure that the requests are properly authorized. For example, the frontend 729 may determine whether the user associated with the training request is authorized to initiate the training process.

Similarly, frontend 749 processes all deployment and execution requests received from user devices 702 and provisions virtual machine instances 742. In some embodiments, the frontend 749 serves as a front door to all the other services provided by the model hosting system 140. The frontend 749 processes the requests and makes sure that the requests are properly authorized. For example, the frontend 749 may determine whether the user associated with a deployment request or an execution request is authorized to access the indicated model data and/or to execute the indicated machine learning model.

The training data store 760 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 760 is depicted as being located external to the model training system 120 and the model hosting system 140, this is not meant to be limiting. For example, in some embodiments not shown, the training data store 760 is located internal to at least one of the model training system 120 or the model hosting system 140.

In some embodiments, the training metrics data store 765 stores model metrics. While the training metrics data store 765 is depicted as being located external to the model training system 120 and the model hosting system 140, this is not meant to be limiting. For example, in some embodiments not shown, the training metrics data store 765 is located internal to at least one of the model training system 120 or the model hosting system 140.

The container data store 770 stores container images, such as container images used to form ML training containers 730 and/or ML scoring containers 750, that can be retrieved by various virtual machine instances 722 and/or 742. While the container data store 770 is depicted as being located external to the model training system 120 and the model hosting system 140, this is not meant to be limiting. For example, in some embodiments not shown, the container data store 770 is located internal to at least one of the model training system 120 and the model hosting system 140.

The training model data store 775 stores model data files. In some embodiments, some of the model data files are comprised of a single file, while other model data files are packages of multiple individual files. While the training model data store 775 is depicted as being located external to the model training system 120 and the model hosting system 140, this is not meant to be limiting. For example, in some embodiments not shown, the training model data store 775 is located internal to at least one of the model training system 120 or the model hosting system 140.

The model prediction data store 780 stores outputs (for example, execution results) generated by the ML scoring containers 750 in some embodiments. While the model prediction data store 780 is depicted as being located external to the model training system 120 and the model hosting system 140, this is not meant to be limiting. For example, in some embodiments not shown, the model prediction data store 780 is located internal to at least one of the model training system 120 and the model hosting system 140.

While the model training system 120, the model hosting system 140, the training data store 760, the training metrics data store 765, the container data store 770, the training model data store 775, and the model prediction data store 780 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 702 via the one or more network(s) 106.

Various example user devices 702 are shown in FIG. 7, including a desktop computer, laptop, and a mobile phone, each provided by way of illustration. In general, the user devices 702 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 120 and/or the model hosting system 140 provides the user devices 702 with one or more user interfaces, command-line interfaces (CLI), application programming interfaces (API), and/or other programmatic interfaces for submitting training requests, deployment requests, and/or execution requests. In some embodiments, the user devices 702 can execute a stand-alone application that interacts with the model training system 120 and/or the model hosting system 140 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional aspects that add additional features to some embodiments. However, such notation should not be taken to mean that these are the only options or optional operations, and/or that blocks with solid borders are not optional in certain embodiments.

Reference numerals with suffix letters (e.g., 918A-918N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
receiving, by a data extractor in a provider network from one or more data repositories, domain-specific text data;
receiving a RoBERTa-class language model from a model hosting system in the provider network;
training, by a model training system in the provider network, the RoBERTa-class language model using the domain-specific text data, thereby generating a pretrained domain-specific language model;
storing the pretrained domain-specific language model at the model hosting system;
modifying the domain-specific text data using the pretrained domain-specific language model, thereby creating word embeddings;
applying global average pooling to the word embeddings by applying average pooling to the word embeddings for all tokens and submitting the word embeddings to a plurality of different architectures including one or more dense layers with dropout, and one or more dense layers without dropout;
feeding the word embeddings into one or more dense layers of a neural network, thereby training a classification task; and
performing the classification task using the pretrained domain-specific language model.

2. The computer-implemented method of claim 1, wherein training the RoBERTa-class language model using the domain-specific text data comprises one or both of:
submitting entire documents to the RoBERTa-class language model; or
summarizing documents, thereby generating document summaries, and submitting the document summaries to the RoBERTa-class language model.

3. A computer-implemented method comprising:
receiving domain-specific text data;
receiving a language model;
training the language model using the domain-specific text data, thereby generating a pretrained domain-specific language model;
modifying the domain-specific text data using the pretrained domain-specific language model, thereby creating word embeddings;
applying global average pooling to the word embeddings by applying average pooling to the word embeddings for all tokens and submitting the word embeddings to a plurality of different architectures including one or more dense layers with dropout, and one or more dense layers without dropout;
feeding the word embeddings into one or more dense layers of a neural network, thereby training a classification task; and
performing the classification task using the pretrained domain-specific language model.

4. The computer-implemented method of claim 3, wherein receiving domain-specific text data comprises receiving domain-specific text data at a data extractor in a provider network from one or more data repositories.

5. The computer-implemented method of claim 3, wherein the language model is a RoBERTa-class language model.

6. The computer-implemented method of claim 3, wherein receiving the language model comprises receiving the language model from a model hosting system in a provider network.

7. The computer-implemented method of claim 3, wherein training the language model using the domain-specific text data comprises training the language model using a model training system in a provider network.

8. The computer-implemented method of claim 3, further comprising storing the pretrained domain-specific language model at a model hosting system in a provider network.

9. The computer-implemented method of claim 3, wherein training the language model using the domain-specific text data comprises one or both of:
submitting entire documents to the language model; or
summarizing documents, thereby generating document summaries, and submitting the document summaries to the language model.

10. The computer-implemented method of claim 3, wherein the language model is an off-the-shelf model.

11. The computer-implemented method of claim 3, wherein the classification task comprises scoring sentiment into a plurality of categories.

12. A system comprising:
a first one or more electronic devices to implement a model hosting system in a multi-tenant provider network; and
a second one or more electronic devices to implement a model training system in the multi-tenant provider network, the model training system including instructions that, upon execution by one or more processors, cause the model training system to:
receive domain-specific text data;
receive a language model;
train the language model using the domain-specific text data, thereby generating a pretrained domain-specific language model;
modify the domain-specific text data using the pretrained domain-specific language model, thereby creating word embeddings;
apply global average pooling to the word embeddings by applying average pooling to the word embeddings for all tokens and submitting the word embeddings to a plurality of different architectures including one or more dense layers with dropout, and one or more dense layers without dropout;
feed the word embeddings into one or more dense layers of a neural network, thereby training a classification task; and
perform the classification task using the pretrained domain-specific language model.

13. The system of claim 12, wherein training the language model using the domain-specific text data comprises one or both of:
submitting entire documents to the language model; or
summarizing documents, thereby generating document summaries, and submitting the document summaries to the language model.

14. The system of claim 12, wherein the language model is a RoBERTa-class language model.

15. The system of claim 12, wherein the classification task comprises scoring sentiment into a plurality of categories.

16. The system of claim 12, wherein receiving domain-specific text data comprises receiving domain-specific text data at a data extractor in a provider network from one or more data repositories.

17. The system of claim 12, wherein receiving the language model comprises receiving the language model from a model hosting system in a provider network.

18. The system of claim 12, wherein training the language model using the domain-specific text data comprises training the language model using a model training system in a provider network.

19. The system of claim 12, the instructions comprising further instructions that, upon execution by the one or more processors, further cause the model training system to store the pretrained domain-specific language model at a model hosting system in a provider network.

20. The system of claim 12, wherein the language model is an off-the-shelf model.

* * * * *